(12) United States Patent
Laborbe et al.

(10) Patent No.: US 11,932,755 B2
(45) Date of Patent: Mar. 19, 2024

(54) RUBBER COMPOSITION, METHOD FOR PREPARING SAME, FUEL HOSE AND FUEL FEED CIRCUIT INCORPORATING SAME

(71) Applicant: Hutchinson, Paris (FR)

(72) Inventors: Elise Laborbe, Courtempierre (FR); Mélissande Bichat, Griselles (FR); Antoine Pichon, Amilly (FR); Laurent Delas, Villemandeur (FR)

(73) Assignee: HUTCHINSON, Paris (FR)

( * ) Notice: Subject to any disclaimer, the term of this patent is extended or adjusted under 35 U.S.C. 154(b) by 630 days.

(21) Appl. No.: 16/838,317

(22) Filed: Apr. 2, 2020

(65) Prior Publication Data

US 2020/0317900 A1    Oct. 8, 2020

(30) Foreign Application Priority Data

Apr. 5, 2019   (FR) ...................................... 19 03699

(51) Int. Cl.
*C08L 27/18*   (2006.01)
*B29C 48/00*   (2019.01)
(Continued)

(52) U.S. Cl.
CPC ............ *C08L 27/18* (2013.01); *B29C 48/022* (2019.02); *C08K 3/04* (2013.01); *C08K 3/34* (2013.01);
(Continued)

(58) Field of Classification Search
None
See application file for complete search history.

(56) References Cited

U.S. PATENT DOCUMENTS 4,713,418 A * 12/1987 Logothetis .............. C08L 27/18
                                                     525/200
5,514,734 A *  5/1996 Maxfield .................. C08K 7/10
                                                     524/789
(Continued)

FOREIGN PATENT DOCUMENTS

CA         2736749 A1 *  3/2010   ................ C08K 3/34
CA         2477669 C  *  5/2010   ......... G03G 15/2025
(Continued)

OTHER PUBLICATIONS

Machine translation of KR 2017120324 A, retrieved Nov. 2022 (Year: 2022).*

(Continued)

*Primary Examiner* — Nicole M. Buie-Hatcher
(74) *Attorney, Agent, or Firm* — Alston & Bird LLP

(57) ABSTRACT

The invention in relates in particular to a rubber composition able to be extruded to form an inner layer of a fuel hose for a motor vehicle, a method for preparing this composition, this hose and a fuel feed circuit of a motor vehicle incorporating it. This composition is based on at least one fluoroelastomer (FKM) and includes a filler and a micronised powder of at least one fluorinated thermoplastic polymer which are dispersed in said at least one fluoroelastomer. According to the invention, the composition includes said micronised powder according to a quantity greater than 20 phr (phr: parts by weight per 100 parts of elastomer(s)), and the filler includes at least one inorganic filler having lamellas which has an aspect ratio greater than 30 and which is based on a phyllosilicate chosen from kaolinite and micas, or is based on a talc.

30 Claims, 35 Drawing Sheets

(51) Int. Cl.

| | | |
|---|---|---|
| *B29L 23/00* | (2006.01) | |
| *B29L 23/24* | (2006.01) | |
| *C08K 3/04* | (2006.01) | |
| *C08K 3/34* | (2006.01) | |
| *C08K 5/13* | (2006.01) | |
| *C08K 5/14* | (2006.01) | |
| *C08K 7/16* | (2006.01) | |
| *C08L 27/16* | (2006.01) | |
| *C08L 27/20* | (2006.01) | |
| *F16L 11/06* | (2006.01) | |
| *F16L 11/08* | (2006.01) | |

(52) U.S. Cl.
CPC .................. *C08K 5/13* (2013.01); *C08K 5/14* (2013.01); *C08K 7/16* (2013.01); *C08L 27/16* (2013.01); *C08L 27/20* (2013.01); *F16L 11/06* (2013.01); *F16L 11/08* (2013.01); *B29C 2948/92019* (2019.02); *B29C 2948/92209* (2019.02); *B29L 2023/005* (2013.01); *B29L 2023/245* (2013.01); *C08K 2201/003* (2013.01); *C08K 2201/005* (2013.01); *C08K 2201/016* (2013.01); *C08L 2203/18* (2013.01); *C08L 2205/02* (2013.01); *C08L 2205/025* (2013.01); *C08L 2205/03* (2013.01)

(56) References Cited

U.S. PATENT DOCUMENTS

| | | | | |
|---|---|---|---|---|
| 5,840,796 A | * | 11/1998 | Badesha | C08K 3/34 |
| | | | | 524/449 |
| 6,797,760 B1 | * | 9/2004 | Ebrahimian | C08K 3/346 |
| | | | | 524/445 |
| 10,294,344 B2 | * | 5/2019 | Verschuere | C08K 3/22 |
| 2011/0274861 A1 | | 11/2011 | Stevens | |
| 2018/0346664 A1 | | 12/2018 | Nishiguchi et al. | |

FOREIGN PATENT DOCUMENTS

| | | | | | |
|---|---|---|---|---|---|
| CN | 109535613 A | * | 3/2019 | ............. | C08L 27/16 |
| DE | 10 2014 223979 A1 | | 5/2016 | | |
| KR | 2017120324 A | * | 10/2017 | | |
| WO | WO 1999/07781 | | 2/1999 | | |
| WO | WO-0148077 A2 | * | 7/2001 | ............... | C08K 3/01 |
| WO | WO-2017083688 A1 | * | 5/2017 | ........... | B29C 48/875 |

OTHER PUBLICATIONS

Ash (2003; 2013). Handbook of Paint and Coating Raw Materials, vols. 1-2 (2nd Edition)—Suzorite 325-S. Synapse Information Resources, Inc . . . Retrieved from https://app.knovel.com/hotlink/pdf/id:kt00BGPB01/handbook-paint-coating/suzorite-325-s (Year: 2003).*

Noel. "Talc—The solution to challenges in automotive." Rubber World 244.1 (2011): 28-34 (Year: 2011).*

Wypych, George. (2016). Handbook of Fillers (4th Edition)—2.1.56 Kaolin. ChemTec Publishing. Retrieved from https://app.knovel.com/hotlink/pdf/id:kt0111AZH2/handbook-fillers-4th/kaolin (Year: 2016).*

Lambourne, R. Strivens, T.A.. (1999). Paint and Surface Coatings—Theory and Practice (2nd Edition)—3.12.2.1 Carbon Black. Woodhead Publishing. pp. 128-165. Retrieved from https://app.knovel.com/hotlink/pdf/id:kt005C7LOC/paint-surface-coatings/carbon-black, carbon blacks are inorganic (Year: 1999).*

Machine translation of CN 109535613, retrieved Nov. 2022 (Year: 2022).*

Search Report for France Application No. FR1903699 dated Dec. 4, 2019, 2 pages.

1st Office Action for China Application No. CN 202010254017.5 dated Sep. 21, 2022 with English Translation (18 pages).

* cited by examiner

RUBBER COMPOSITION, METHOD FOR PREPARING SAME, FUEL HOSE AND FUEL FEED CIRCUIT INCORPORATING SAME

CROSS-REFERENCE TO RELATED APPLICATIONS

This application claims priority to French Application No. 19 03699 filed Apr. 5, 2019, the contents of which are incorporated herein by reference in their entirety.

TECHNICAL FIELD

The invention relates to a crosslinkable rubber composition able to be extruded to form an inner layer of a fuel hose for a motor vehicle with a combustion or hybrid engine, a method for preparing this crosslinkable composition, a crosslinked rubber composition able to form an extruded inner layer of this hose, a tubular extrudate able to form this inner layer, this fuel hose and a fuel feed circuit of a motor vehicle incorporating it. The invention applies in particular to extruded parts such as a multilayer hose conveying a fuel of the petrol type with several rubber layers with intercalation of a textile reinforcement (although many other multilayer structures can be considered for this hose and that the latter is able to convey other fuels, for example of the diesel or biofuel type), and to injected parts that are impermeable to such fuels such as for example membranes, seals or sealing profiles.

PRIOR ART

In a known manner, the hoses of a fuel feed system of a motor vehicle comprise an inner layer usually based on a fluoroelastomer (FKM rubber) and at least one outer layer for example based on an epichlorhydrin rubber (ECO), often with intercalation of an intermediate layer that can also be based on an ECO and on a textile reinforcement.

EP 3 026 078 A1 discloses a hose for a motor vehicle including an inner layer used as a barrier to aggressive environments and an outer layer made from crosslinked rubber. The inner layer is formed from a rubber composition that is based on at least one FKM, comprises a powder based on at least one fluoropolymer such as a PTFE according to a maximum quantity of 5 phr (phr: parts by weight per 100 parts of elastomer(s)) and which is provided to have improved dynamic effectiveness and resistance to the propagation of tears.

DE 10 2009 003 528 A1 discloses a vulcanised rubber composition for example for an inner layer of a hose e.g. for fuel which is designed to resist abrasion and fluids. The composition comprises in particular at least one rubber, a fluorinated thermoplastic polymer such as a PTFE and preferably carbon black as a reinforcing filler, with the fluorinated thermoplastic polymer present in the composition in the form of a degraded powder.

These known fuel hoses usually have resistances to fuel and to swelling that are satisfactory in particular thanks to their inner layer based on a FKM, however their permeability to the fuel conveyed does not always satisfy the increasingly strict requirements in order to reduce to a minimum the toxic emissions of combustion engines. In particular, an increasing number of motor vehicles with petrol engines have to satisfy very constraining environmental standards, such as the American standard "PZEV" (Partial Zero Emission Vehicle) which imposes a maximum evaporated fuel emissions threshold of 2 mg/day. It has therefore been sought in the last few years to further reduce the permeability to fuels of the hoses that convey them in the feed circuits of motor vehicles.

DISCLOSURE OF THE INVENTION

A purpose of the present invention is therefore to propose a rubber composition for an extruded part such as a fuel hose that overcomes in particular this disadvantage, without penalising the aptitude for use by extrusion of the crosslinkable composition and the mechanical properties of the crosslinked composition, or for an injected part also impermeable to a fuel such as a membrane, a seal or a sealing profile.

This purpose is achieved in that the Applicant has just surprisingly discovered that if, in at least one fluoroelastomer, a sufficiently high quantity of a micronised powder of a fluorinated thermoplastic polymer combined with an inorganic filler which is based on a phyllosilicate chosen from kaolinite and micas or on a talc and which has a high aspect ratio greater than 30 is dispersed, then a crosslinkable rubber composition (i.e. non-crosslinked) can be obtained which is able to form an extruded inner layer of a fuel hose for a motor vehicle, with the composition having in particular together:
- a reduced permeability in the crosslinked state, in comparison with a control composition devoid of this combination and with a composition that is not in accordance with the invention comprising said micronised powder but devoid of this inorganic filler with a high aspect ratio,
- mechanical properties that are at least retained, in comparison with these control compositions that are not in accordance with the invention, and
- an improved aptitude for use by extrusion in the crosslinkable state, in comparison with this composition that is not in accordance with the invention.

More precisely, a crosslinkable rubber composition according to the invention is based on at least one fluoroelastomer (FKM) and comprises a filler and a micronised powder of at least one fluorinated thermoplastic polymer which are dispersed in said at least one fluoroelastomer. According to the invention, the composition comprises said micronised powder according to a quantity greater than 20 phr (phr: parts by weight per 100 parts of elastomer(s)) and the filler comprises at least one inorganic filler which has an aspect ratio greater than 30 and which is based on a phyllosilicate chosen from kaolinite and micas, or based on a talc.

The expression "based on" means in the present description that the composition or the ingredient considered mostly comprises by weight the constituent concerned, i.e. according to a mass fraction greater than 50%, more preferably greater than 75% and able to range up to 100%.

"Filler" means in the present description one or more individual filler(s) with grade(s) that are reinforcing or not for the elastomer concerned which is/are dispersed homogeneously in the composition, and "inorganic filler" means a clear filler (sometimes called "white filler"), in opposition to organic fillers that are reinforcing or not such as carbon blacks and graphite, for example.

"Phyllosilicate" means in a known manner in the present description a subgroup of the group of silicates, with the phyllosilicates being constructed by stacking of tetrahedral layers ("T") where the tetrahedrals share three vertices out of four (the "basal" oxygens), with the fourth vertex (the "apical" oxygen) being connected to an octahedral layer ("0") occupied by different cations.

"Kaolinite" means in a known manner in the present description a mineral species of phyllosilicate comprised of hydrated aluminium silicate, of formula $Al_2Si_2O_5(OH)_4$.

"Mica" means in a manner known in the present description a mineral group inside the phyllosilicates mainly based on aluminium and potassium silicate, the group of micas is subdivided into a multitude of subgroups.

"Talc" means in a manner known in the present description a mineral species comprised of doubly hydroxylated magnesium silicate of formula $Mg_3Si_4O_{10}(OH)_2$, that an contain traces of nickel, iron, aluminium, calcium, sodium and other magnesium silicates, with the specification that the number of usual talcs have an aspect ratio less than or equal to 30 and therefore cannot be used in a composition according to the invention.

"Aspect ratio" means in a manner known in the present description the ratio of the average largest dimension (usually width or length) over the average smallest dimension (usually thickness) that characterises lamellas of said inorganic filler according to the invention. This average ratio is measured according to the invention by the scanning electron microscopy technique (SEM) via a Centaurus® (back-scattered electrons) or SE2 (secondary electrons) sensor, by preparing the samples of fillers by a Au/Pd metallisation.

Note that a crosslinkable composition according to the invention advantageously has a minimised sliding regarding the walls of an extruder, as explained in the examples hereinafter. Indeed, the Applicant has demonstrated in the tests thereof that the adding of said inorganic filler with a high aspect ratio to a sufficient quantity of the fluorinated micronised powder makes it possible to improve the aptitude of the use of the composition comprising the FKM—fluorinated powder mixture in extrusion, by providing a solution to the following technical problem due to the fluorinated powder that resides in particular in:
- an unsatisfactory feed of the extruder, resulting in a phenomenon of backflow of the composition at the feed roller, and/or in
- a strong irregularity in the pressure at the extruder outlet, due to the sliding of the composition in the process of extrusion on the screw.

This problem is resolved in the invention by the adding of said filler, specifically inorganic with a high aspect ratio such as defined hereinabove, which unexpectedly makes it possible to prevent or at least to minimise the sliding phenomena of the crosslinkable composition in the extrusion die, which makes possible the industrial use of the compositions according to the invention to form extruded inner layers of hoses.

In addition, the Applicant has also demonstrated that the adding to said powder of fluorinated thermoplastic polymer(s) of said inorganic filler with a high aspect ratio, not only does not penalise the mechanical properties of the crosslinked composition, but again surprisingly further decreases the permeability to the fuel of this composition in comparison with said composition that is not in accordance with the invention (with said fluorinated powder but without said inorganic filler with a high aspect ratio).

Consequently, the combination according to the invention of said inorganic filler with a high aspect ratio and of said fluorinated powder bears witness to an effect of synergy, going beyond the expected respective properties of these two components in relation with the FKM(s) of the composition.

Also note that a rubber composition according to the invention is not to be confused with a thermoplastic elastomer composition, with this composition of the invention being indeed in particular characterised by a homogeneous dispersion of the micronised powder of said at least one fluorinated thermoplastic polymer and therefore being structurally very different from a fluorinated thermoplastic vulcanisate of the F-TPV type in particular (wherein the thermoplastic polymer base contains a dispersion of rubber nodules).

Advantageously, said at least one inorganic filler with a high aspect ratio can have an average transversal smaller dimension which defines an average thickness of lamellas comprised between 100 nm and 500 nm (more preferably between 120 nm and 480 nm, even more preferably between 140 nm and 460 nm) and an average larger dimension which defines an average width of lamellas comprised between 1 μm and 50 μm (more preferably between 2 μm and 40 μm, even more preferably between 3 μm and 38 μm).

According to a first embodiment of the invention, said at least one inorganic filler with a high aspect ratio is based on said phyllosilicate (i.e. chosen from kaolinite and micas), of which the aspect ratio is at least 35 and preferably at least 80.

According to this first example, said at least one inorganic filler with a high aspect ratio can include kaolinite, being based on a kaolin of which preferably an average transversal smaller dimension defines an average thickness of lamellas comprised between 120 nm and 280 nm and an average larger dimension defines an average width of lamellas comprised between 4 μm and 12 μm.

Alternatively according to this first example, said at least one inorganic filler with a high aspect ratio can be based on a mica for example of the muscovite or phlogopite type of which the aspect ratio is at least 120, and of which preferably an average transversal smaller dimension defines an average thickness of lamellas comprised between 110 nm and 470 nm and an average larger dimension defines an average width of lamellas comprised between 13 μm and 40 μm.

According to a second embodiment of the invention, said at least one inorganic filler with a high aspect ratio is based on a talc of which the aspect ratio is at least 35, and of which an average transversal smaller dimension defines an average thickness of lamellas preferably comprised between 120 nm and 180 nm and an average larger dimension defines an average width of lamellas preferably comprised between 4 μm and 8 μm.

According to another general characteristic of the invention, the crosslinkable composition can include said micronised powder of at least one fluorinated thermoplastic polymer according to a quantity greater than or equal to 30 phr, more preferably greater than or equal to 40 phr.

According to a preferred example of the crosslinkable composition according to the invention, said micronised powder is based on at least one polytetrafluoroethylene (PTFE) modified or not (e.g. optionally functionalised) in terms of said at least one fluorinated thermoplastic polymer, and has an average particle diameter D50 measured according to the standard ASTM D 4464 which is comprised between 2 μm and 20 μm, preferably between 5 μm and 15 μm.

Advantageously, the filler of the crosslinkable composition according to the invention comprises said at least one inorganic filler with a high aspect ratio according to a mass fraction of at least 40% and preferably greater than 50%. In other terms, the filler of this composition is preferably based on (i.e. mostly comprises by weight) the or inorganic filler(s) with high aspect ratio(s).

According to a preferred characteristic of the crosslinkable composition, this composition comprises said micronised powder according to a quantity comprised between 45 and 65 phr (more preferably between 47 and 63 phr) and said at least one inorganic filler with a high aspect ratio according to a quantity comprised between 5 and 25 phr (more preferably between 6 and 23 phr).

Also preferably, the filler of the crosslinkable composition of the invention can further comprise an organic filler that is reinforcing or not based on a carbon black and/or on a graphite, preferably with less than 5 phr of carbon black of a grade with little reinforcing and less than 10 phr of graphite in the composition (even more preferably with less than 3 phr of carbon black that is little reinforcing, such as a black of series MT, and less than 8 phr of graphite).

According to another general characteristic of the invention, the crosslinkable composition can include a crosslinking system comprising a peroxide (including a mixed crosslinking system with a peroxide combined with a non-peroxide crosslinking agent) or a bisphenol.

Note that this crosslinking system with peroxide can advantageously include an organic peroxide and a crosslinking agent and a crosslinking coagent comprising for example triallyl cyanurate (TAC) or triallyl isocyanurate (TAIC), and that this crosslinking system with peroxide is more preferably used in the composition of the invention according to a quantity comprised between 2 and 6 phr (coagent included, even more preferably between 3 and 5 phr).

According to an advantageous characteristic of the invention, the crosslinkable composition can have, after passing through a Garvey extrusion die, a pressure applied to the composition measured at the outlet of the die that is continuously comprised between $25 \cdot 10^5$ Pa and $70 \cdot 10^5$ Pa and preferably between $30 \cdot 10^5$ Pa and $65 \cdot 10^5$ Pa, with the extruder having the following characteristics:
- a conveying screw of diameter D equal to 25 mm and of length equal to 12D,
- a feed belt 2 to 3 cm wide,
- a feed roller cooled with a water circulation system,
- a screw body heated to 85° C. by a regulator by means of water,
- the die being heated to 95° C. or 110° C. by a heating ring,
- said pressure applied to the composition at the outlet of the die being measured by a sensor at a head of the screw,
- a speed of the screw varying between 4 and 20 rpm regulated according to the aspect of the extruded composition at the outlet of the die, and
- a conveyor belt on which the composition is disposed for the driving thereof.

Note that this extrusion protocol was precisely followed by the Applicant in order to demonstrate, via this range of pressures measured at the die outlet, that the pressure at the extrusion outlet is advantageously continuously maintained substantially constant or at least stabilised in a relatively narrow range of values, thanks to the aforementioned synergy effect between said fluorinated micronised powder and said inorganic filler with a high aspect ratio which makes it possible to prevent or at least to minimise the sliding of the crosslinkable composition in the process of extrusion on the screw of the die.

According to a preferred embodiment of the invention, said at least one fluoroelastomer is an FKM chosen from terpolymers of vinylidene fluoride (VDF)-hexafluoropropylene (HFP)-tetrafluoroethylene (TFE) with a fluorine mass rate greater than or equal to 70% (more preferably comprised between 70 and 72%), the composition preferably having a Mooney viscosity ML(1+4) at 100° C. measured according to the standard ASTM D 1646 comprised between 50 and 75 (more preferably comprised between 54 and 72).

Advantageously, the crosslinkable composition of the invention can include at least two so-called fluoroelastomers (FKM), comprising a first FKM and a second FKM with respective Mooney viscosities ML(1+10) at 121° C., measured according to the standard ASTM D 1646, comprised between 17 and 21 and between 22 and 26.

Even more advantageously, the first FKM is present in the composition according to a quantity of at least 50 phr, preferably comprised between 50 and 75 phr, and this second FKM is present in the composition according to a quantity of at most 50 phr, preferably comprised between 25 and 50 phr.

A crosslinked rubber composition according to the invention is able to form an extruded inner layer of a fuel hose for a motor vehicle, and this crosslinked composition is the product of a chemical crosslinking by a peroxide or a bisphenol of the crosslinkable composition of the invention such as defined hereinabove.

Note that this crosslinking of the composition can be obtained by curing, via a conventional bringing to temperature for example to a temperature comprised between 160 and 200° C., without a post-curing step.

According to another characteristic of this crosslinked composition of the invention, the composition can have an average permeation flux Q with an alcohol essence of the FAM B type such as described in the standard DIN 51604, said permeation flux being measured through a plate formed from the composition over 18 days at 40° C. according to the standard D 451652 of PSA of June 2010, which is less than $0.30 \text{ g} \cdot \text{h}^{-1} \cdot \text{m}^{-2}$ (more preferably less than $0.25 \text{ g} \cdot \text{h}^{-1} \cdot \text{m}^{-2}$, able to be less than $0.20 \text{ g} \cdot \text{h}^{-1} \cdot \text{m}^{-2}$).

Note that this average permeation flux thus measured of the composition is significantly reduced compared to that of said rubber composition that is not in accordance with the invention comprising said fluorinated micronised powder, but not said inorganic filler with a high aspect ratio.

Advantageously, the crosslinked composition of the invention satisfies at least one of the conditions (i) to (iii) hereinafter (more preferably (i) and (ii) combined, even more preferably (i), (ii) and (iii) combined):
(i) at least one of the following secant moduli M50, M100 and M200 respectively at 50%, 100% and 200% deformation, measured in uni-axial tensile force according to the standard ASTM D 412:
   M50 greater than 3 MPa, preferably greater than or equal to 4 MPa,
   M100 greater than 4 MPa, preferably greater than or equal to 5 MPa,
   M200 greater than 6 MPa, preferably greater than or equal to 7 MPa;
(ii) a resistance to breaking R/r, measured in uni-axial tensile force according to the standard ASTM D 412, greater than 8 MPa and preferably greater than 10 MPa; and
(iii) a Shore A hardness measured after 3 seconds according to the standard ASTM D2240 which is greater than 70 and preferably greater than or equal to 80.

Note that these mechanical properties in the crosslinked state (i) and/or (ii) and/or (iii) that can characterise a composition of the invention are advantageously of the same magnitude or even improved in relation to the same properties of said composition that is not in accordance with the invention comprising said fluorinated micronised powder, but not said inorganic filler with a high aspect ratio.

A method of preparing according to the invention of a crosslinkable composition such as defined hereinabove comprises the following steps:
   a) thermomechanical mixing of said at least one FKM, of said filler and of said micronised powder of at least one fluorinated thermoplastic polymer and of other ingredients of the composition with the exception of a crosslinking system, the mixing being preferably implemented at a falling temperature between 90 and 100° C. with a peak temperature between 105 and 115° C.;
   b) mechanical mixing of the mixture obtained in step a) on cylinders with the adding of the crosslinking system preferably comprising a peroxide or a bisphenol, for the obtaining of the crosslinkable composition.

Note that step a) can be implemented in an internal mixer, with a piston pressure ranging for example from $10^5$ Pa to $3 \cdot 10^5$ Pa, and that step b) can be implemented in an open mixer and include a plurality of passages at the end.

A tubular extrudate according to the invention is able to form after crosslinking an inner layer of a fuel hose for a motor vehicle, and this extrudate is formed from a crosslinkable composition (i.e. not yet crosslinked) such as defined hereinabove.

As explained hereinabove, note that this invention is not limited to extrudates and also relates to non-extruded parts impermeable to a fuel, that can for example be injected (e.g. parts made via injection moulding of the crosslinkable composition).

A fuel hose for a motor vehicle with a combustion or hybrid engine according to the invention, in particular for a fuel of the petrol type, includes a radially internal layer and at least one radially external layer, and according to the invention the radially internal layer is formed from a crosslinked composition such as defined hereinabove, with the hose preferably further including, between the radially internal and external layers, at least one radially intermediate layer and a textile reinforcement.

Note that this hose of the invention is thus obtained by (co)crosslinking of the rubber layers thereof, carried out by a suitable bringing to temperature (curing for example between 160 and 200° C.), as known in the prior art.

A fuel feed circuit of a motor vehicle with a combustion or hybrid engine according to the invention, with this circuit comprising lines between a fuel tank and a fuel injection rail, is such that at least one of the lines comprises a hose such as defined hereinabove.

BRIEF DESCRIPTION OF THE DRAWINGS

Other characteristics, advantages and details of this invention shall appear when reading the following description of several embodiments of the invention, given for the purposes of information and in a non-limiting way in relation with the accompanying drawings, among which.

EMBODIMENTS OF THE INVENTION

Figure 1A:
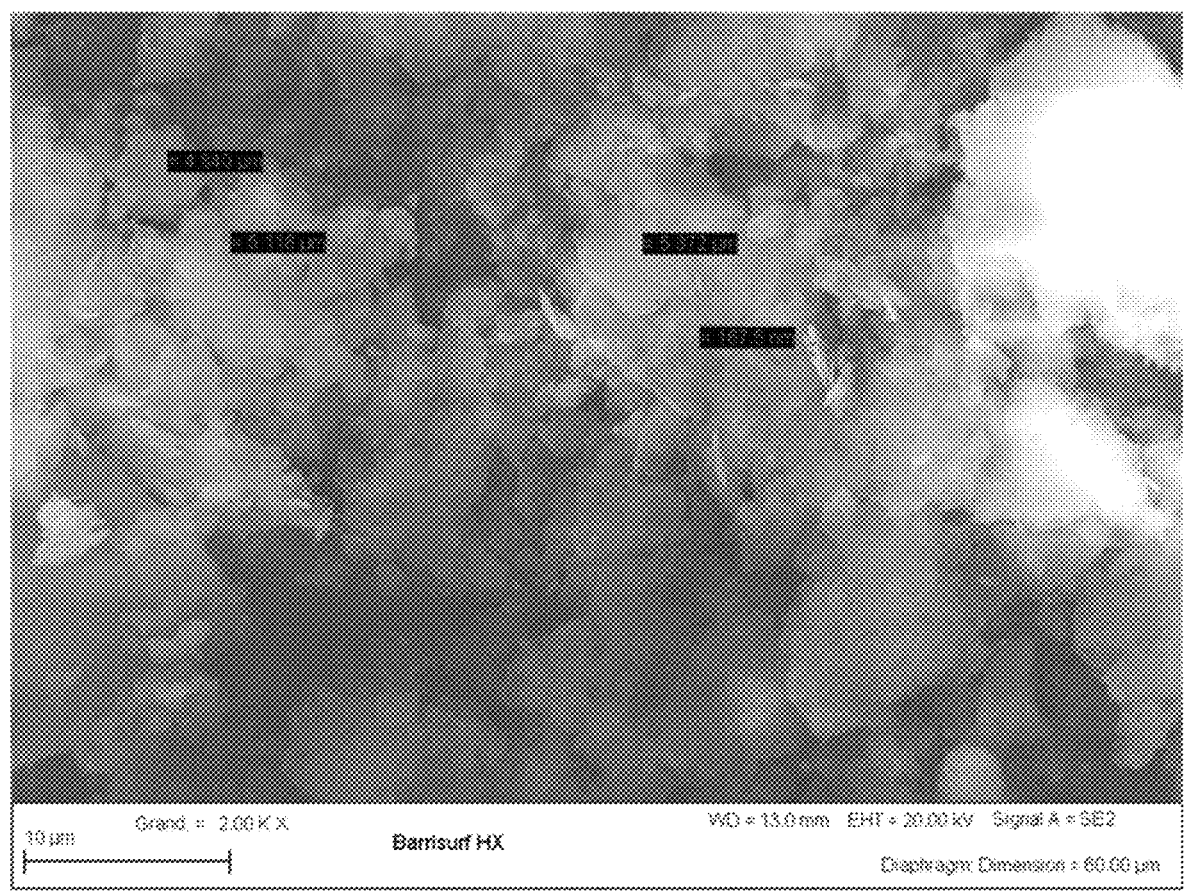
FIG. 1A is a scanning electron microscope snapshot (SEM hereinafter) of an inorganic filler with a high aspect ratio Barrisurf® HX (kaolin) tested according to the invention showing thicknesses and widths of lamellas.
Figure 1B:
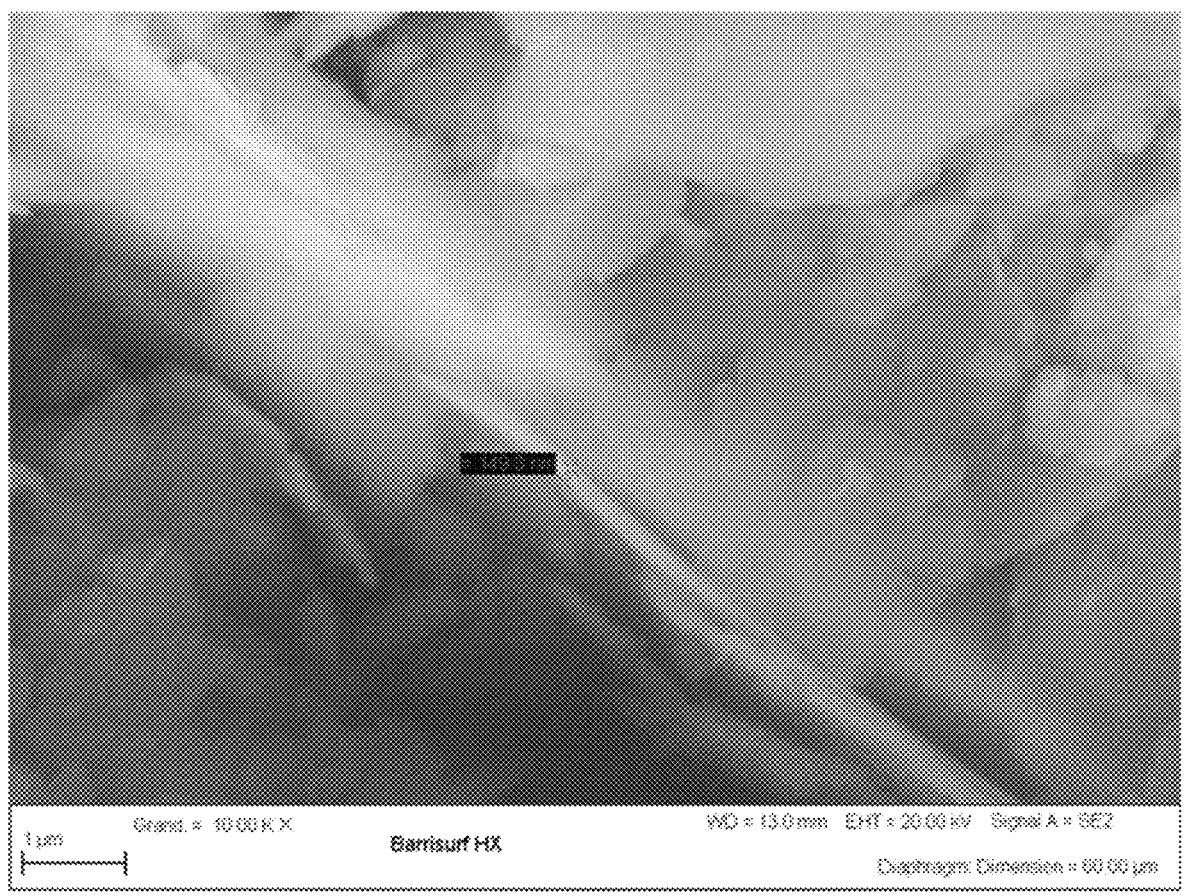
FIG. 1B is another SEM snapshot of the inorganic filler of FIG. 1A showing the thickness of a lamella.
Figure 2A:
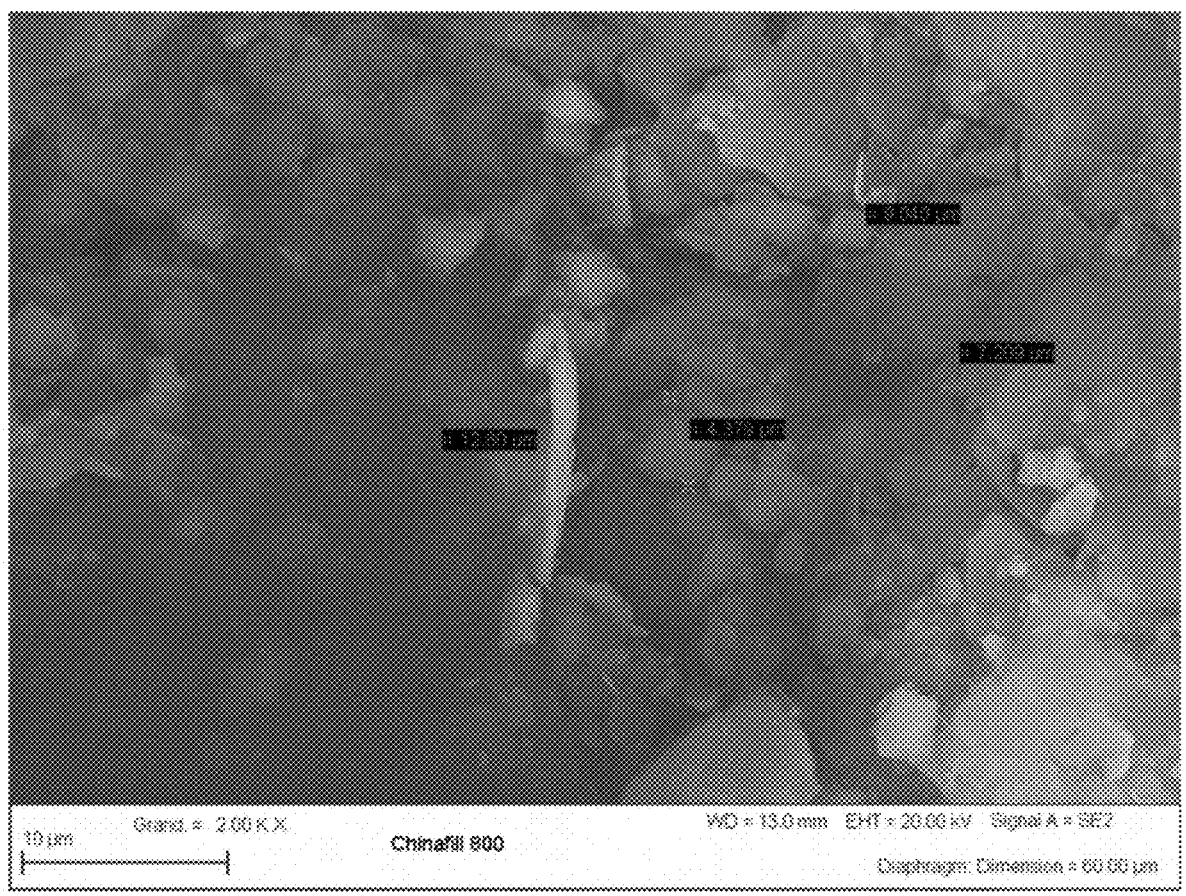
FIG. 2A is a SEM snapshot of another inorganic filler with a high aspect ratio Chinafill® 800 (kaolin) tested according to the invention showing widths of lamellas.
Figure 2B:
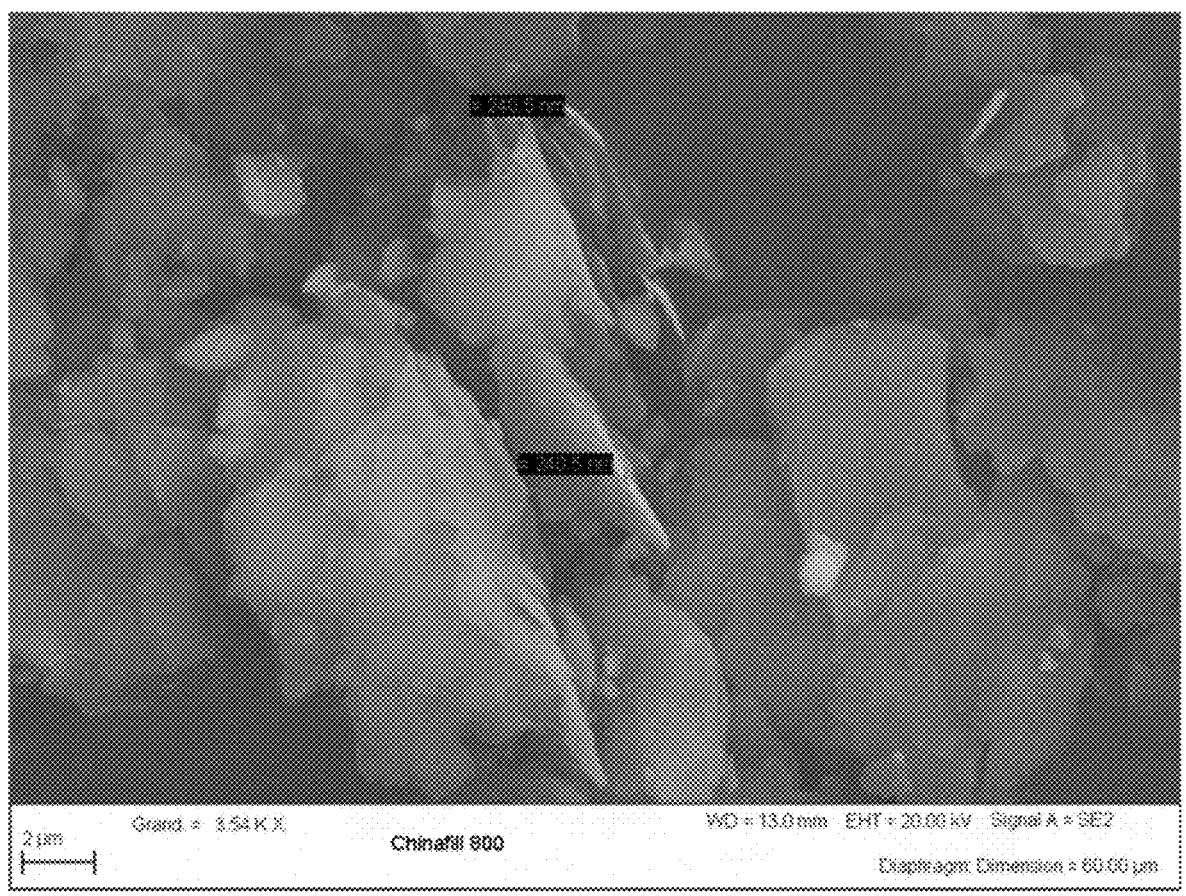
FIG. 2B is another SEM snapshot of the inorganic filler of FIG. 2A showing thicknesses of lamellas.
Figure 3A:
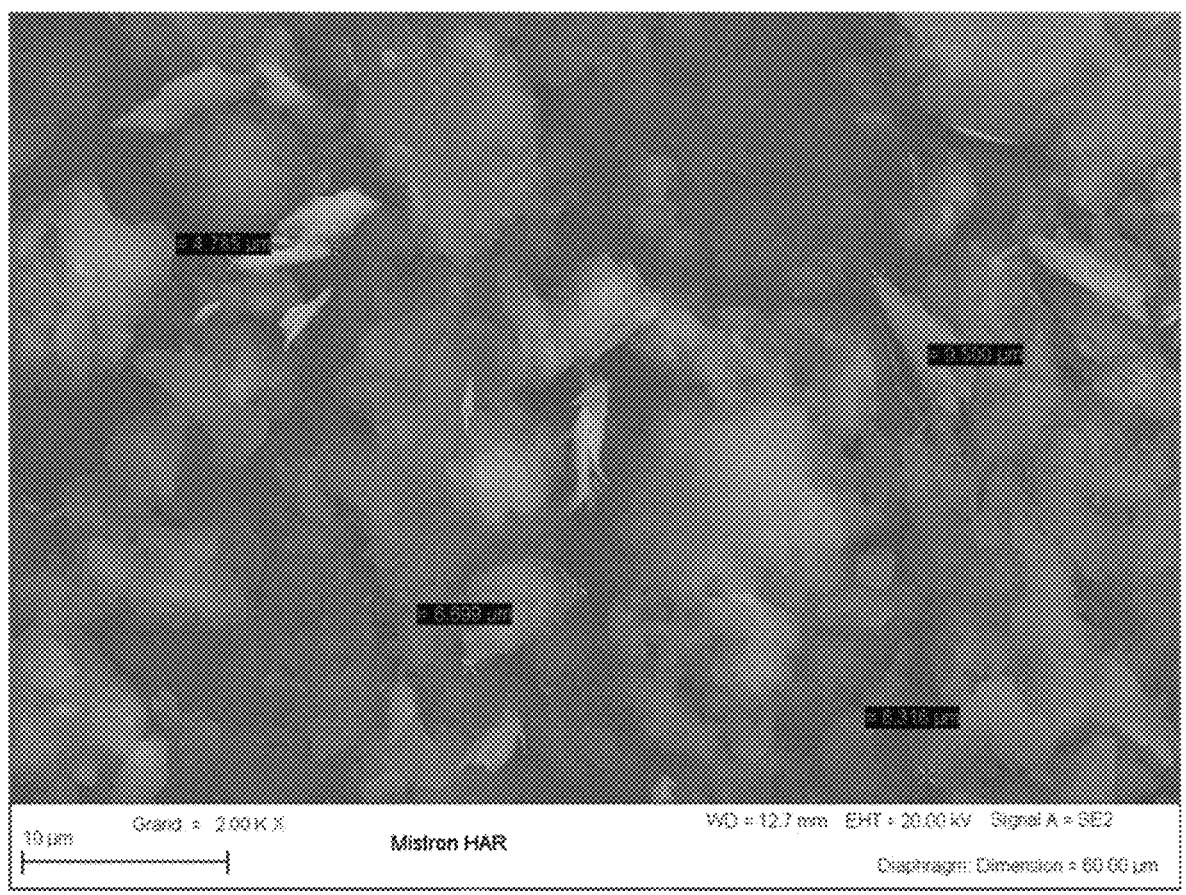
FIG. 3A is an SEM snapshot of an inorganic filler with a high aspect ratio Mistron® HAR (talc) tested according to the invention showing widths of lamellas.
Figure 3B:
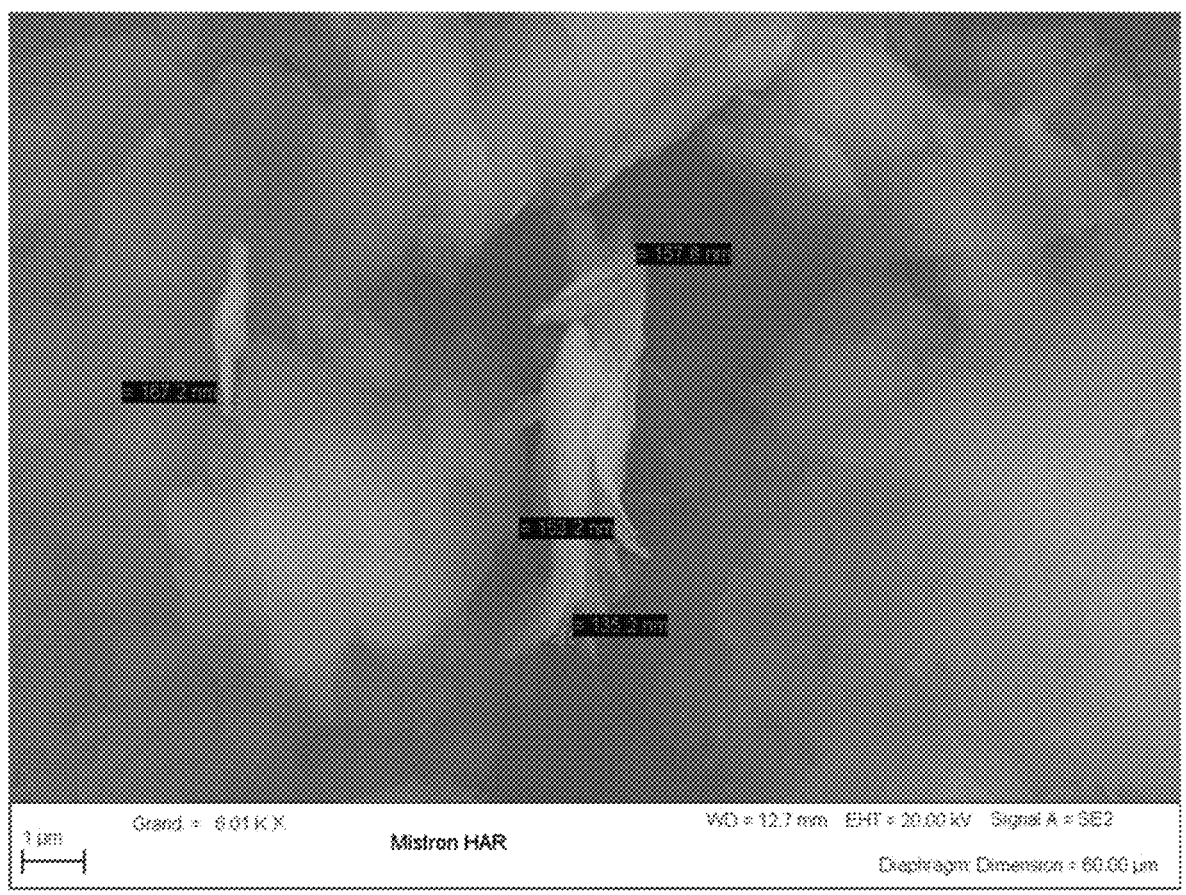
FIG. 3B is another SEM snapshot of the inorganic filler of FIG. 3A showing thicknesses of lamellas.
Figure 4A:
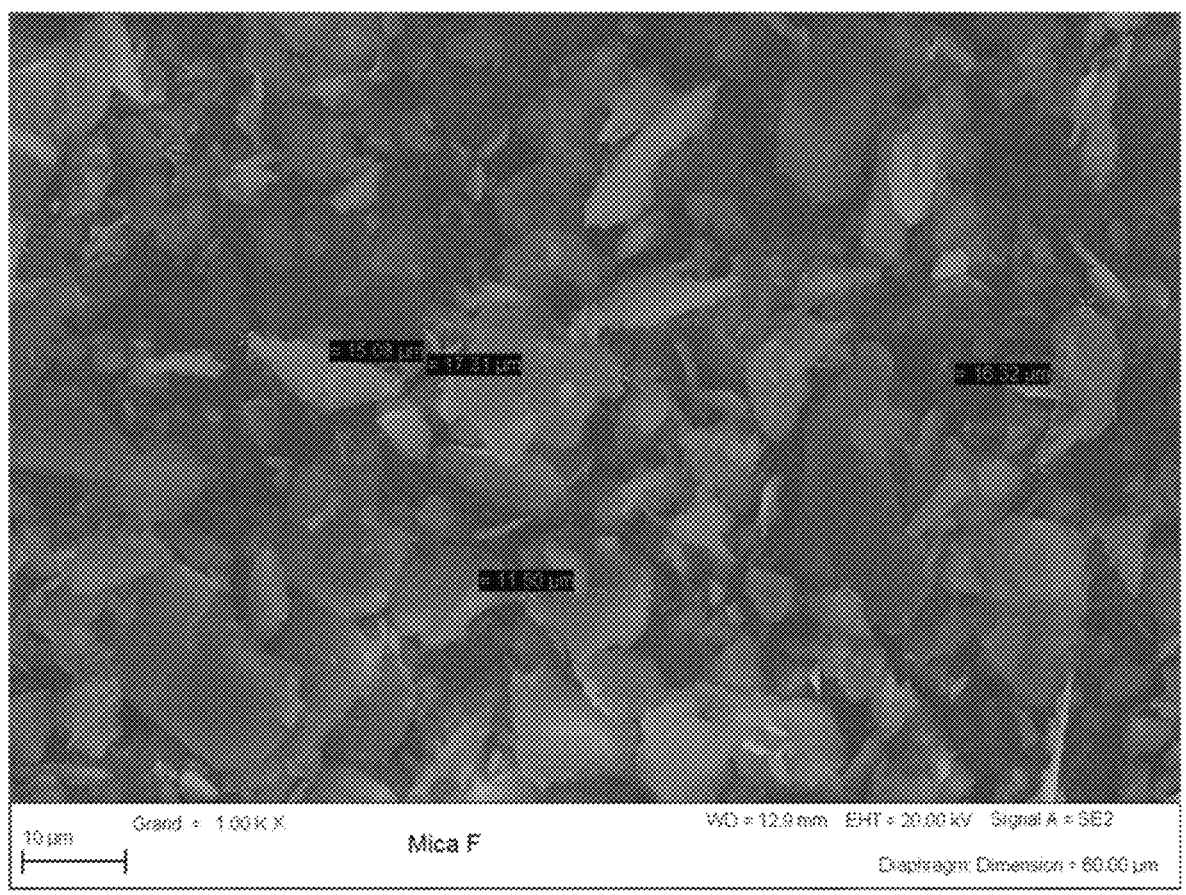
FIG. 4A is an SEM snapshot of an inorganic filler with a high aspect ratio "Mica F" (mica) tested according to the invention showing widths of lamellas.
Figure 4B:
FIG. 4B is another SEM snapshot of the inorganic filler of FIG. 4A showing thicknesses of lamellas.
Figure 5A:
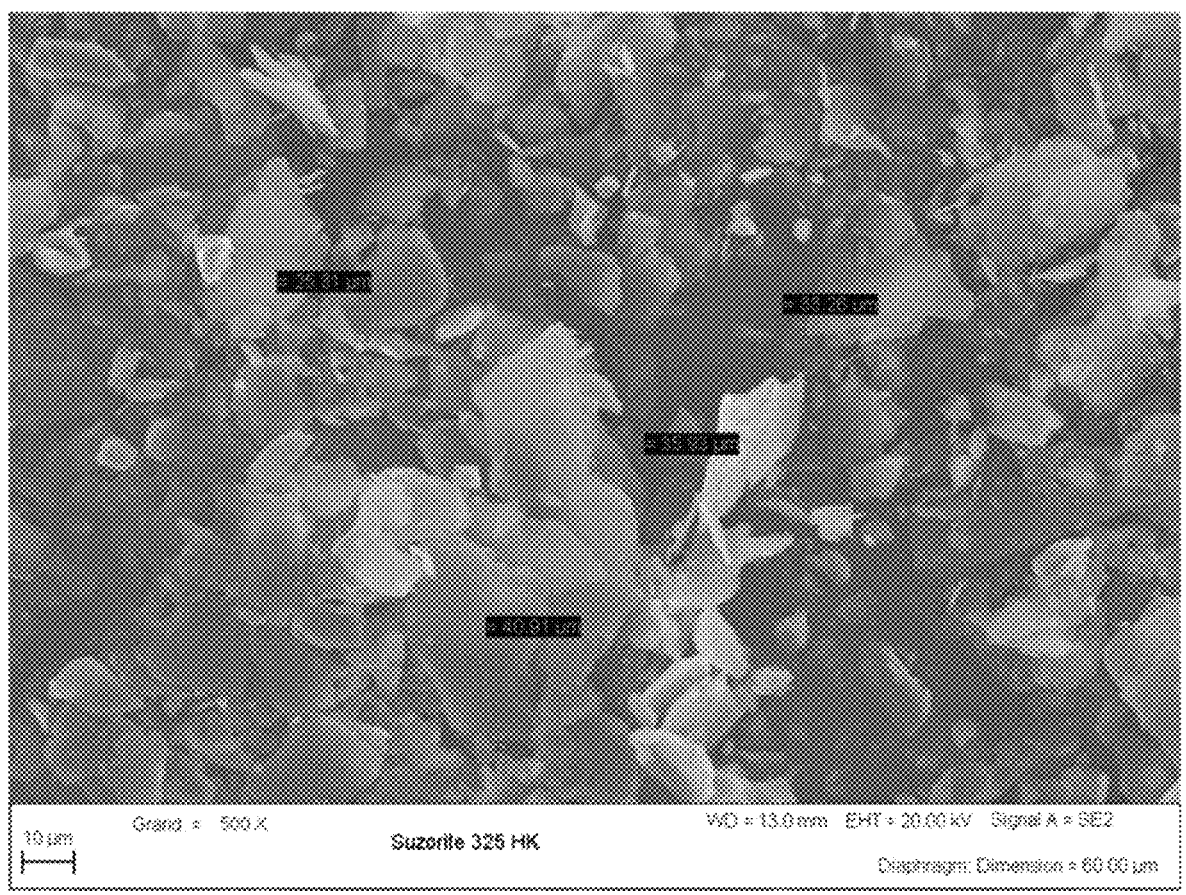
FIG. 5A is an SEM snapshot of an inorganic filler with a high aspect ratio Suzorite® 325 HK (mica) tested according to the invention showing widths of lamellas.
Figure 5B:
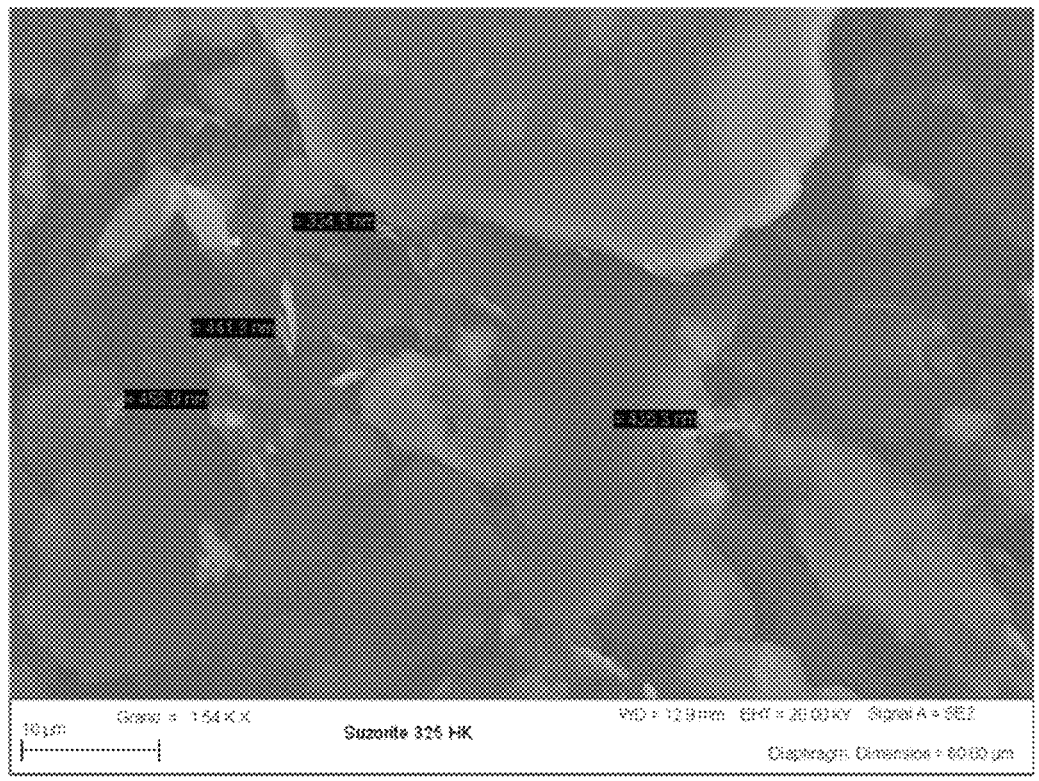
FIG. 5B is another SEM snapshot of the inorganic filler of FIG. 5A showing thicknesses of lamellas.

In all of the following examples, the crosslinkable compositions based on one or two FKMs have been prepared by implementing the following method.

a) Step of Thermomechanical Mixing in an Internal Mixer:
   adjustment to 35° C.,
   beginning of the cycle at a rotating speed of the blades of the rotor of 40 rpm,
   initial instant t0: introduction of the gum (i.e. of the FKM(s)),
   t=1 min.: introduction of the other ingredients of the composition except the crosslinking system with peroxide, and pressure of the piston at $10^5$ Pa then $3 \cdot 10^5$ Pa,
   t=2 min. 30 s: pressure of the piston at $3 \cdot 10^5$ Pa and speed of the blades of 50 rpm.,
   t=3 min.: scanning,
   t=3 min. 30 s: change in the speed of the blades to 80 rpm.,
   t=6 min. or 95° C. displayed: falling, the temperature at the peak being about 110° C.

b) Mechanical Mixing in an Open Mixer (on Cylinders):
   adding of the crosslinking system with peroxide, then
   7 passages at the end of the crosslinkable composition.

All of the compositions tested at instant t95 at 180° C. were crosslinked, without a post-curing step.

The following table 1 lists the characteristics of the powders of PTFE used in the compositions tested (D50 being measured according to ASTM D 4464).

TABLE 1

| Commercial name | Supplier | Nature | Characteristics |
|---|---|---|---|
| Algoflon® L203 | Solvay | PTFE powder | BET > 7.5 $m^2/g$ – D50 = 5 µm |
| Polymist® F5A EX | Solvay | PTFE powder | BET = 3 $m^2/g$ – D50 = 12 µm |

The following table 2 lists the characteristics of the inorganic fillers with high aspect ratios used in the compositions tested.

TABLE 2

| Commercial name | Supplier | Nature | Characteristics |
|---|---|---|---|
| Chinafill® 800 | AKW | Kaolin | Average thickness = 250 nm<br>Average width = 10 µm<br>Aspect ratio = 40 |
| Barrisurf® HX | Imerys | Kaolin | Average thickness = 150 nm<br>Average width = 5 µm<br>Aspect ratio = 35 |
| Mistron® HAR | Imerys | Talc | Average thickness = 150 nm<br>Average width = 6 µm<br>Aspect ratio = 40 |
| Mica F | Aspanger | Mica | Average thickness = 130 nm<br>Average width = 16 µm<br>Aspect ratio = 125 |
| Suzorite® 325 HK | Imerys | Mica | Average thickness = 450 nm<br>Average width = 35 µm<br>Aspect ratio = 80 |

The aspect ratios of these fillers were determined by preparing samples by Au/Pd metallisation, then by the scanning electron microscopy technique (SEM) by means of a Centaurus® (backscattered electrons) or SE2 (secondary electrons) sensor. In light of the definition of the aspect ratio by the ratio of the average largest dimension (width of the lamellas) over the average smallest dimension (thickness of the lamellas), these average dimensions were measured by observation under SEM, as can be seen in FIGS. 1A-1B 2A-2B, 3A-3B, 4A-4B, and 5A-5B and details in table 2.

First Series of Tests:

This first series shows in particular the effect of adding the filler Chinafill® 800 in control compositions A and according to the invention B, C, D, E, G, which are all based on a single and same FKM of denomination DAIEL G-902 (DAIKIN) and which all include 50 phr of powder of PTFE of denomination Algoflon® L203, while the composition F that is not in accordance with the invention based on FKM "DAIEL G-902" comprises only 15 phr of this powder of PTFE.

The filler Chinafill® 800 was added according to 13 phr to the composition B and according to 20 phr to the compositions C-D, and a blend of 7 and 12 phr of Chinafill® 800 and of 6 and 8 phr graphite Timrex® C-Therm 002 to the compositions E and G, respectively. The composition F is devoid of Chinafill® 800 and of any other inorganic filler, comprising only 10 phr of a carbon black as a filler.

The crosslinking system used was formed from DHBP 45 (crosslinking agent: organic peroxide) and from coagent TAIC (liquid), and only for compositions D, F and G an implementation assistance agent ("VPA 2") was furthermore added.

Figure 6:
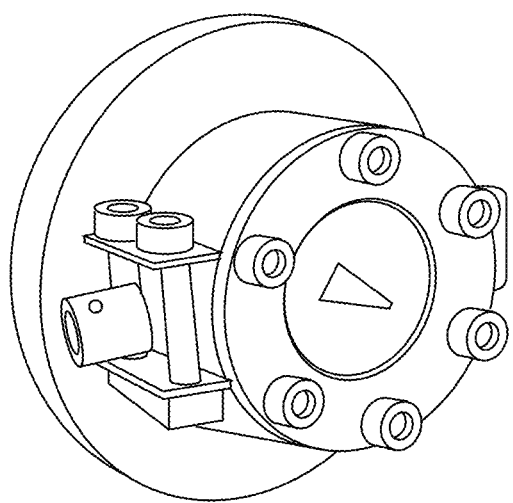
FIG. 6 is a photograph showing in perspective a Garvey extrusion die used in the invention to test the aptitude for use by extrusion of the crosslinkable compositions of the invention.
Figure 7A:
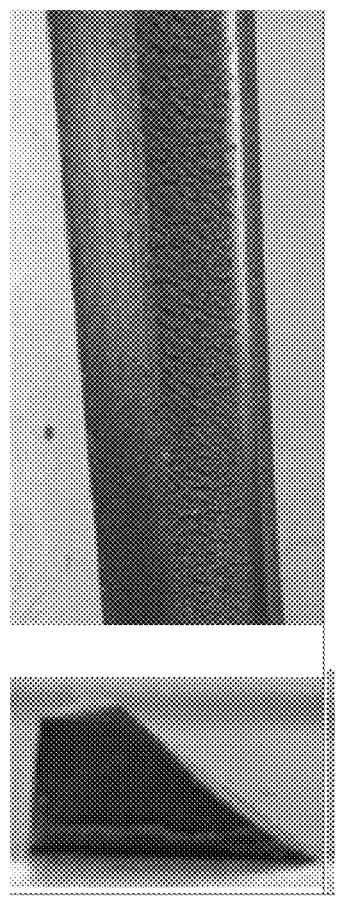
FIG. 7A comprises two upper and lower photographs showing respectively the top and an end of an extrudate of a control composition A, obtained by the die of FIG. 6.
Figure 7B:
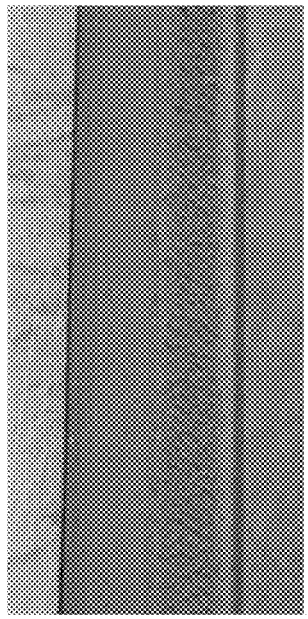
FIG. 7B comprises two upper and lower photographs showing respectively the top and an end of an extrudate of a composition B according to the invention incorporating the filler Chinafill® 800, obtained by the die of FIG. 6.
Figure 7B:
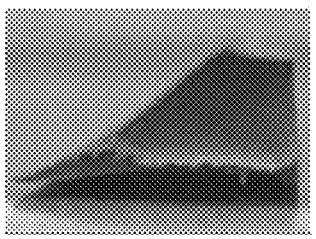
Figure 7C:
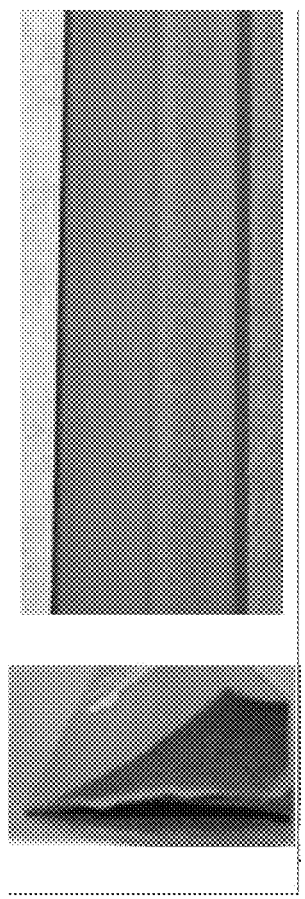
FIG. 7C comprises two upper and lower photographs showing respectively the top and an end of an extrudate of a composition C according to the invention incorporating the filler Chinafill® 800, obtained by the die of FIG. 6.
Figure 7D:
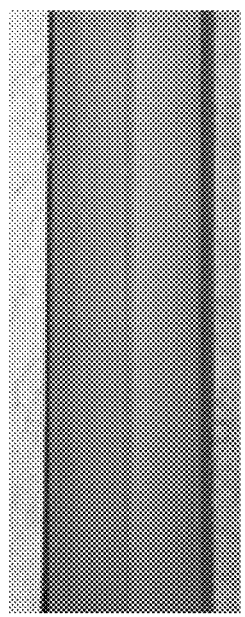
FIG. 7D comprises two upper and lower photographs showing respectively the top and an end of an extrudate of a composition D according to the invention incorporating the filler Chinafill® 800, obtained by the die of FIG. 6.
Figure 7D:
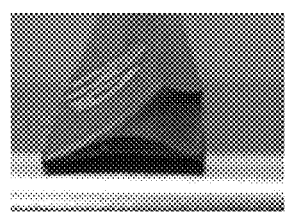
Figure 7E:
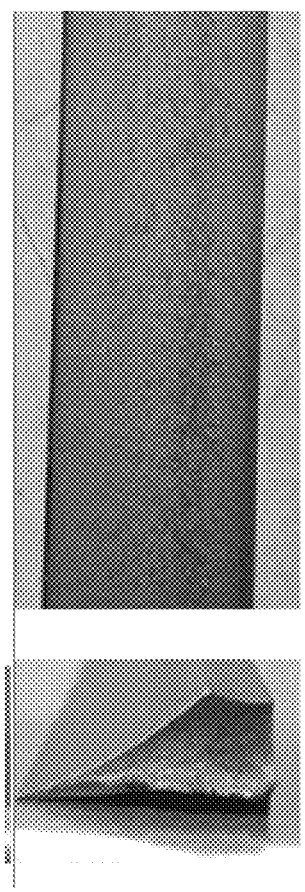
FIG. 7E comprises two upper and lower photographs showing respectively the top and an end of an extrudate of a composition E according to the invention incorporating the filler Chinafill® 800 and graphite, obtained by the die of FIG. 6.
Figure 7F:
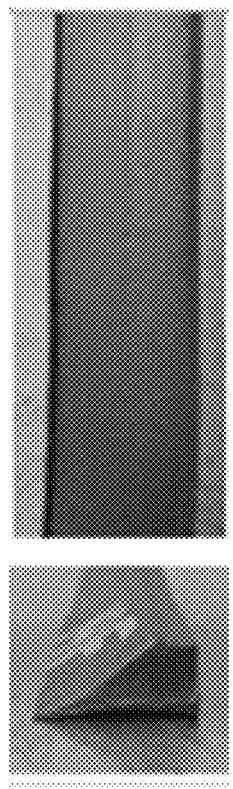
FIG. 7F comprises two upper and lower photographs showing respectively the top and an end of an extrudate of a composition F that is not in accordance with the invention incorporating an insufficient quantity of fluorinated micronised powder and of carbon black in place of the inorganic filler, obtained by the die of FIG. 6.
Figure 7G:
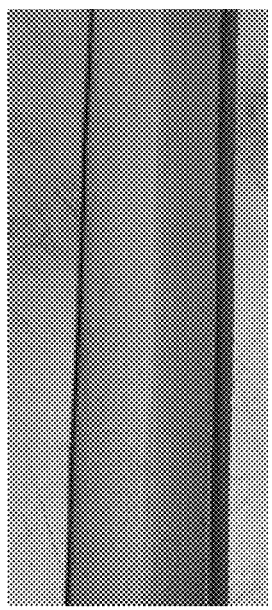
FIG. 7G comprises two upper and lower photographs showing respectively the top and an end of an extrudate of a composition G according to the invention incorporating the filler Chinafill® 800 and graphite, obtained by the die of FIG. 6.
Figure 7G:
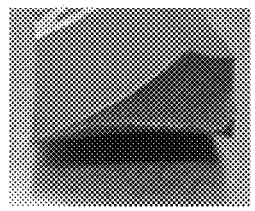

Garvey extrusion tests were conducted on the various crosslinkable compositions so as to evaluate the extrudability thereof, i.e. aptitude for use by extrusion, by following the prescriptions of the standard NF T43-016. Recall that the Garvey test is a usual appreciation method of the aptitude for socking of the non-crosslinked rubber compositions. According to this test the various compositions were extruded with a Garvey die such as the one that can be seen in the photograph of FIG. 6 (die with a substantially prismatic shape with a globally trapezoidal section).

The classification system A was used which ranks on a scale from 1 (poor) to 4 (good) the following parameters:
  swelling and porosity,
  sharpness of the edge (angle of 30° C.),
  uniformity of the surface, and
  continuity of the three other angles.

The following protocol was followed for the extrusion test.

The extrusion was carried out on a laboratory extruder with a conveying screw of diameter D=25 mm and of length 12D. The feeding with a belt 2 to 3 cm wide was carried out, and the feed roller was cooled with a water circulation system. The screw body was heated to 85° C. by a regulator (water). The die was heated to 95° C. or 110° C. (according to the tests) using a heating ring.

During the test, the pressure was measured by a sensor located at the screw head. The speed of the screw was made to vary between 4 and 20 rpm., with the speed having been adjusted according to the aspect of the extrudate at the die outlet.

The extrudate was placed on a conveyor belt which drove it all throughout the test.

Table 3 hereinafter provides details on the formulations of the compositions A to G (quantities in phr), and table 4 hereinafter the results obtained during the extrusion tests in the Garvey die (screw heated to 85° C., die to 95° C., speed of the screw of 8 rpm.).

TABLE 3

|  | A | B | C | D | E | F | G |
|---|---|---|---|---|---|---|---|
| DAIEL G-902 | 100 | 100 | 100 | 100 | 100 | 100 | 100 |
| Black MT N 991 | 5 | 2 | 2 | 2 | 2 | 10 | 2 |
| VPA 2 |  |  |  | 1 |  | 1 | 1 |
| TAIC liq | 2.1 | 2.1 | 2.1 | 2.1 | 2.1 | 2.1 | 2.1 |
| Algoflon L203 | 50 | 50 | 50 | 50 | 50 | 15 | 50 |
| Timrex C-Therm 002 |  |  |  |  | 6 |  | 8 |
| Chinafill 800 |  | 13 | 20 | 20 | 7 |  | 12 |
| DHBP 45 | 2 | 2 | 2 | 2 | 2 | 2 | 2 |

TABLE 4

|  | A | B | C | D | E | F | G |
|---|---|---|---|---|---|---|---|
| Initiation of the feed | Difficult | Good | Good | Good | Good | Good | Good in part |
| Backflow at the feed roller | Yes | No | No | No | No | No | No |
| Pressure at die outlet (in $10^5$ Pa) | Varies from 40 to 4 | 45 | 40 | 45 | 45 | 35 | 45 |
| Aspect (classification system A) | 4.4.3.4 | 4.4.3.4 | 4.4.3.4 | 4.4.4.4 | 4.4.3.4 | 4.4.3.4 | 4.4.4.4 |

FIGS. 7A to 7G show the aspect of the surfaces and of the end profiles respectively obtained for these compositions A to G, following these Garvey extrusion tests.

The control composition A is therefore not correctly extrudable, see the priming of the feed, the undesirable backflow at the feed and the fluctuation in the extrusion pressure obtained for the composition A without filler Chinafill® 800. On the contrary, the compositions B to E and G that incorporate the filler Chinafill® 800, in particular when it is used alone (see compositions B, C, D), show a clear improvement in the extrusion conditions with a resolution of the material sliding problems at the feed and a stabilisation in the extrusion pressure, without degrading the Garvey score on the extrudates obtained, as well as for the composition F that is not in accordance with the invention despite a pressure at the die outlet that is less than that relative to the compositions B to E and G.

FIGS. 8A to 8G show the morphologies respectively obtained for the crosslinked compositions A to G, following the aforementioned crosslinking with peroxide (at t95 at 180° C., without post-curing), with the homogeneous dispersion of the fluorinated powder of PTFE and, for the compositions B to G, of the filler Chinafill® 800.

Table 5 hereinafter shows the properties measured for these compositions A to G, in the non-crosslinked state (Mooney viscosity measured according to the standard ASTM D 1646) as well as in the crosslinked state:

properties in uni-axial tensile force at the initial state according to the standard ASTM D 412,
Delft resistance to tearing,
Shore A hardness at 3 s measured at the initial state according to the standard ASTM D2240,
CSR compression set resistance of type B measured at 22 hours, 135° C. and 25% compression rate, and
FAM B permeability at 40° C. (average permeation rate Q avg over 18 days) measured on a plate according to the standard D 451652 of PSA (June 2010).

TABLE 5

| | unit | A | B | C | D | E | F | G |
|---|---|---|---|---|---|---|---|---|
| Non-crosslinked composition | | | | | | | | |
| ML (1 + 4) 100° C. | MU | 56 | 56 | 60 | 55 | 54 | 46 | 59 |
| Crosslinked composition Initial state traction | | | | | | | | |
| Resistance to break. | MPa | 9.4 | 12.3 | 11.8 | 11.4 | 11.1 | 11.2 | 10.0 |
| Elongation at break. | % | 358 | 346 | 310 | 333 | 364 | 403 | 319 |
| Modulus 50% | MPa | 1.9 | 3.4 | 4.2 | 4.2 | 4.0 | 1.4 | 4.8 |
| Modulus 100% | MPa | 2.5 | 5.0 | 6.2 | 5.7 | 5.0 | 2.1 | 5.7 |
| Modulus 200% | MPa | 4.0 | 7.6 | 8.8 | 7.8 | 6.4 | 3.7 | 7.1 |
| Delft tearing | | | | | | | | |
| Resistance | N/mm | 19.2 | 18.9 | 27.1 | 17.4 | 20.6 | — | 22.8 |
| Shore A hardness at 3 s | | | | | | | | |
| Initial state | Sh A | 70 | 77 | 80 | 80 | 79 | 62 | 82 |
| CSR type B after 22 h at 135° C. and 25% compression | | | | | | | | |
| CSR | % | 14 | 14 | 15 | 16 | 15 | 14 | 19 |
| Permeability - FAM B, at 40° C. (average permeation rate over 18 days) | | | | | | | | |
| Average Q | g · h$^{-1}$ · m$^{-2}$ | 0.32 | 0.16 | — | 0.23 | 0.18 | 0.65 | 0.19 |

Figure 10:
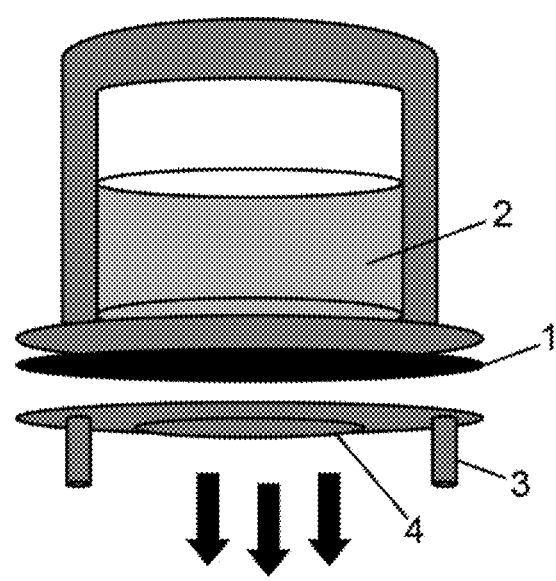
FIG. 10 is an exploded front diagrammatical view, slightly in perspective, of a device for measuring the average permeation flux Q of a plate formed from a rubber composition by an essence over 18 days at 40° C. according to the standard D 451652 of PSA of June 2010.
Figure 11A:
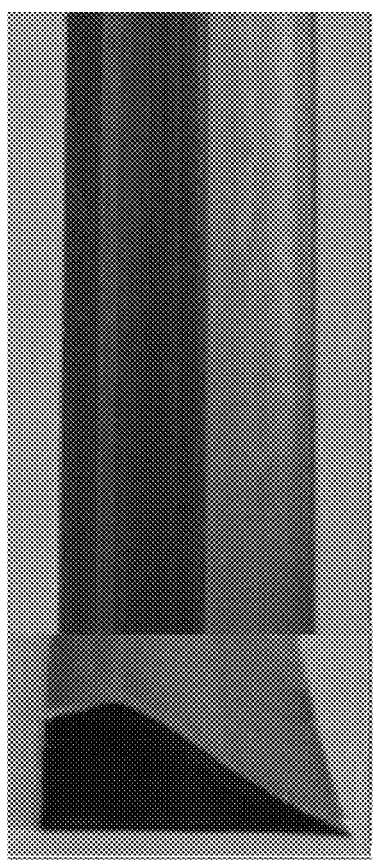
FIG. 11A comprises two upper and lower photographs showing respectively the top and an end of an extrudate of another control composition M, obtained by the die of FIG. 6.
Figure 11B:
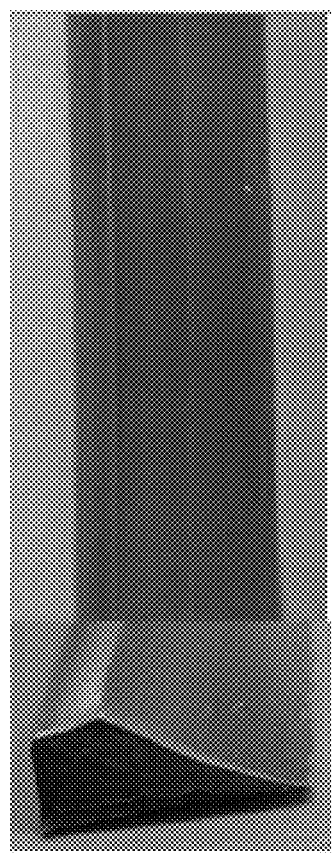
FIG. 11B comprises two upper and lower photographs showing respectively the top and an end of an extrudate of a composition N according to the invention incorporating the filler Barrisurf® HX, obtained by the die of FIG. 6.
Figure 11C:
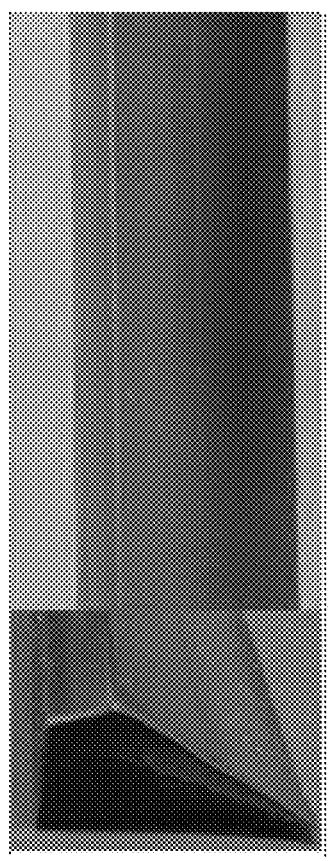
FIG. 11C comprises two upper and lower photographs showing respectively the top and an end of an extrudate of a composition O according to the invention incorporating the filler Chinafill® 800, obtained by the die of FIG. 6.
Figure 11D:
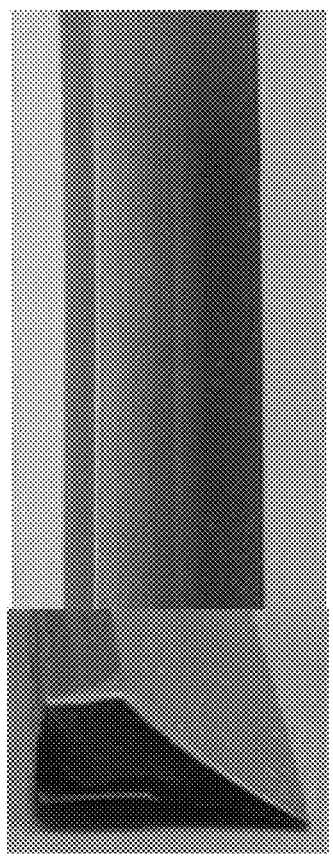
FIG. 11D comprises two upper and lower photographs showing respectively the top and an end of an extrudate of a composition P according to the invention incorporating the filler Mistron® HAR, obtained by the die of FIG. 6.
Figure 11E:
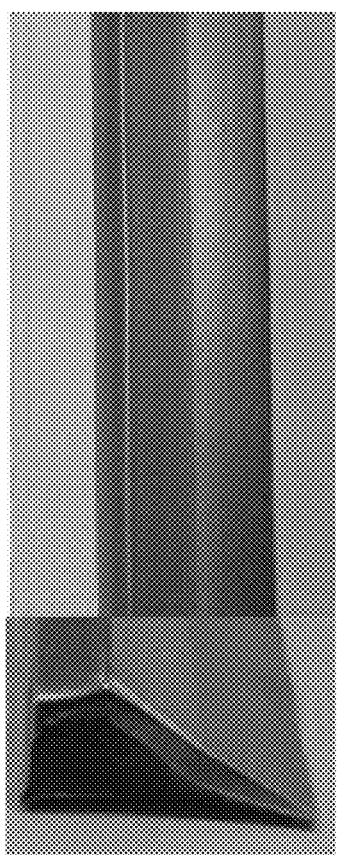
FIG. 11E comprises two upper and lower photographs showing respectively the top and an end of an extrudate of a composition Q according to the invention incorporating the filler Suzorite® 325 HK, obtained by the die of FIG. 6.
Figure 11F:
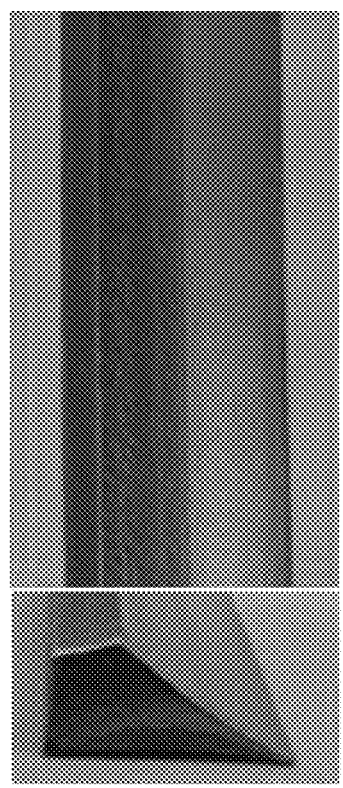
FIG. 11F comprises two upper and lower photographs showing respectively the top and an end of an extrudate of a composition R according to the invention incorporating the filler "Mica F", obtained by the die of FIG. 6.

FIG. 10 shows the device used to measure the average permeation rate of the plate 1 formed from each composition tested by the FAM B fuel housed in a tank 2 of the device, which is formed in the lower portion thereof by means of a screw passing through a closing grid 4. In a known manner, the permeation flux Q, expressed in g·h$^{-1}$·m$^{-2}$, is brought to a nominal plate thickness of 2 mm and is given by the formula:

$$Q=(M_i-M_{i+1})_{max}/24 \cdot S \cdot e/2, \text{ where}$$

$(M_i-M_{i+1})_{max}$ is the maximum difference in mass, in g, between two successive weighings separated by 24 hours,
S is the surface in m$^2$ of the plate-test piece in contact with the fuel on one side and on the other with the open air, and
e is the thickness in mm of the plate-test piece.

Table 5 shows that the modification according to the invention of the formula FKM-PTFE by adding the filler with a high aspect ratio Chinafill® 800 does not penalise the mechanical properties of the compositions B to E and G according to the invention in the crosslinked state in relation to the control composition A devoid of this filler, even by improving some of them (see in particular the resistance to breaking, the increased moduli and Shore hardness), and that this adding of the filler with a high aspect ratio even makes it possible to reduce the permeability to the fuel of the compositions B, D, E, G in relation to this control composition A. Table 5 also shows that using 15 phr of micronised powder of fluoropolymer gives the crosslinked composition F that is not in accordance with the invention a permeability to fuel and mechanical properties that are clearly penalised (see moduli), compared to those of compositions B, D, E and G according to the invention.

Second Series of Tests.

This second series shows in particular the effect of the adding of the filler Barrisurf® HX in compositions according to the invention I, L in relation to control compositions H, J, K without a filler with a high aspect ratio, which are all based on a blend of two DAIEL G-902 FKMs (50 phr) and Tecnoflon P-459 (Solvay: 50 phr) and which include 50 phr (for the compositions H, I, J) or 62.5 phr (for the compositions K, L) of powder of PTFE of denomination Polymist® F5AEX.

The adding of 20 phr of the filler Barrisurf® HX to the compositions I and L of the invention with the adding of 20 phr of a carbon black to the composition J. The crosslinking system and the agent VPA 2 were the same as hereinabove.

Table 6 hereinafter provides details on the formulations of the compositions H to L (quantities in phr), and table 7 hereinafter the results obtained during extrusion tests in the same Garvey die as hereinabove (screw heated to 85° C., die at 95° C., speed of the screw of 8 rpm.).

TABLE 6

| | H | I | J | K | L |
|---|---|---|---|---|---|
| DAIEL G-902 | 50 | 50 | 50 | 50 | 50 |
| Technoflon P-459 | 50 | 50 | 50 | 50 | 50 |
| Noir MT N 991 | 2 | 2 | 20 | 2 | 2 |
| VPA 2 | 1 | 1 | 1 | 1 | 1 |
| TAIC liq | 2.1 | 2.1 | 2.1 | 2.1 | 2.1 |
| Polymist F5AEX | 50 | 50 | 50 | 62.5 | 62.5 |
| Barrisurf HX | | 20 | | | 20 |
| DHBP 45 | 2 | 2 | 2 | 2 | 2 |

TABLE 7

| | H | I | J | K | L |
|---|---|---|---|---|---|
| Initiation of the feed | Good | Good | Good | Good | Good |
| Pressure at die outlet (in 10$^5$ Pa) | Varies from 70 to 0 | 30 to 35 | Varies from 70 to 0 | Varies from 70 to 0 | 45 |

TABLE 7-continued

| | H | I | J | K | L |
|---|---|---|---|---|---|
| Aspect (classification system A) | 4.2.3.3 | 4.2.3.3 | 4.2.2.3 | 4.2.3.3 | 4.2.3.3 |

The control compositions H, J, K therefore are not correctly extrudable, see the fluctuation in the extrusion pressure obtained without a filler with a high aspect ratio. On the contrary, the compositions I and L of the invention that incorporate 20 phr of the filler Barrisurf® HX show a very clear improvement in the extrusion conditions with a stabilisation in the extrusion pressure (in particular thanks to the suppression of the sliding in the screw, as explained hereinafter), without degrading the Garvey score on the extrudates obtained, in comparison with compositions with little filler H, K and with the composition I loaded with 20 phr of carbon black.

Figure 8A:
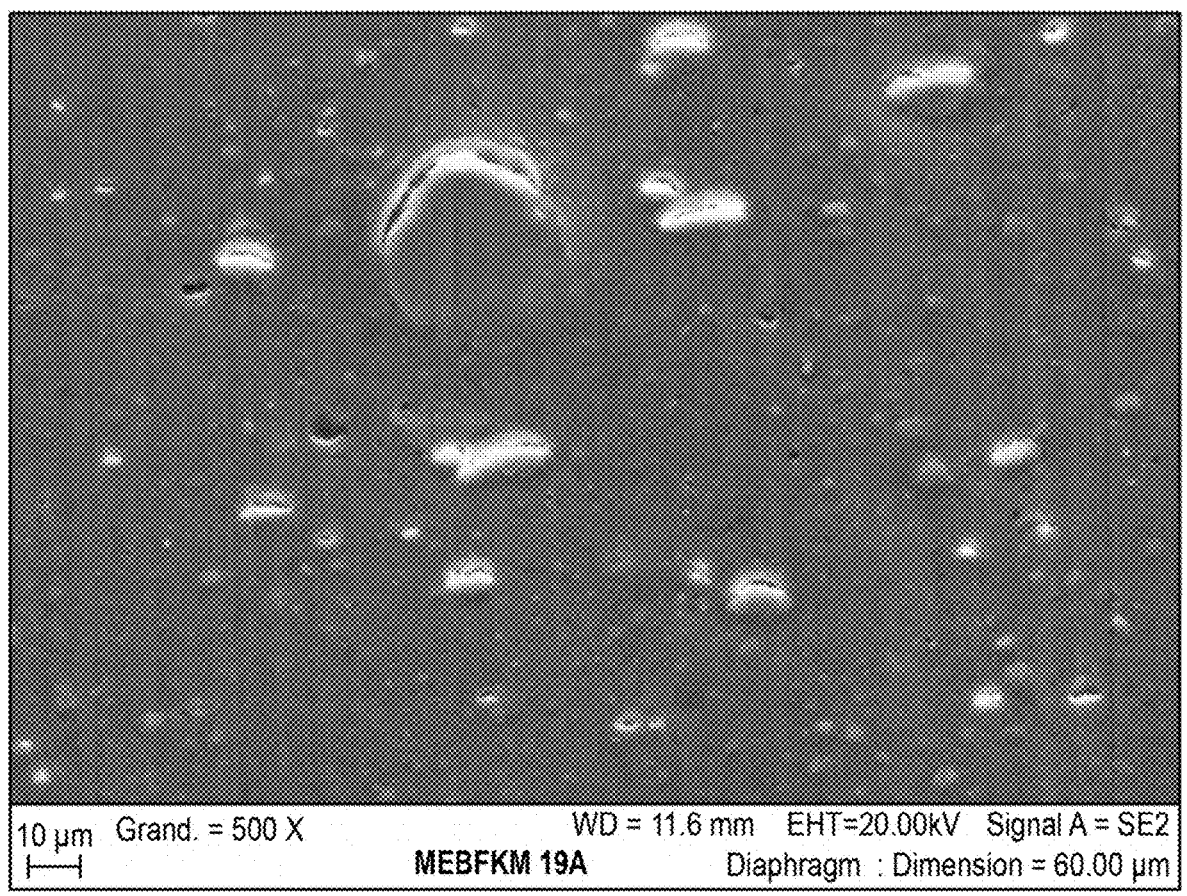
FIG. 8A is a SEM snapshot of the control composition A showing in particular the morphology of the dispersion of the fluorinated micronised powder and of the carbon black.
Figure 8B:
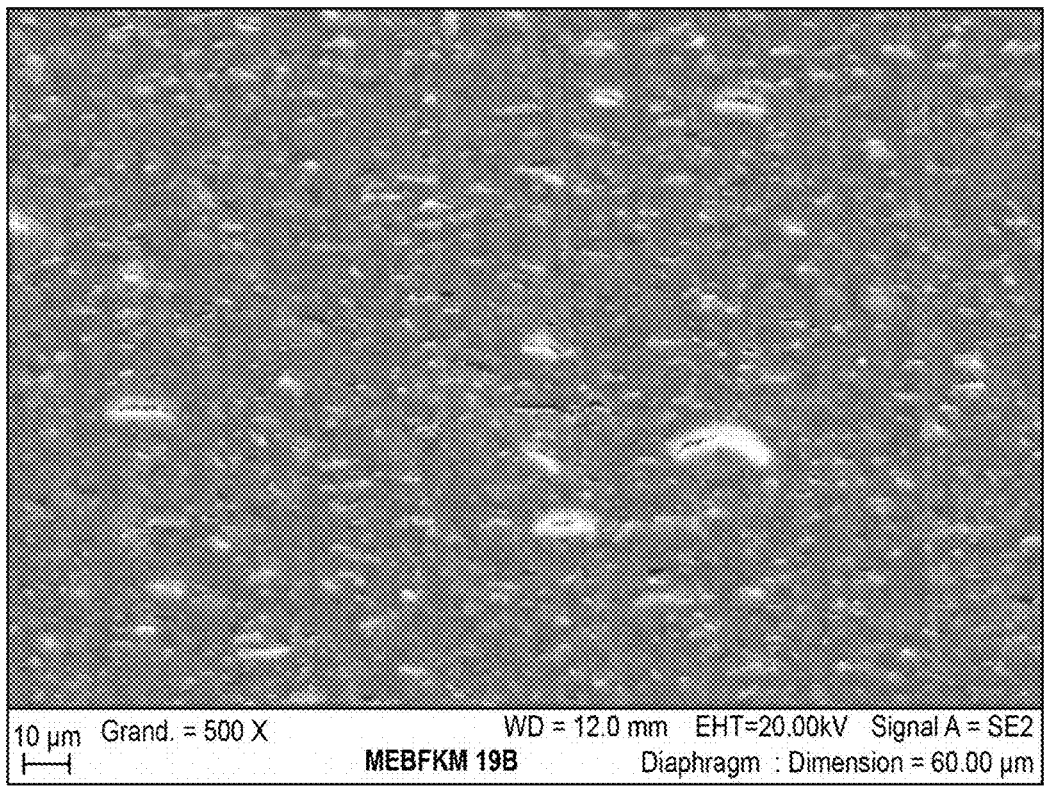
FIG. 8B is a SEM snapshot of the composition B according to the invention showing in particular the morphology of the dispersion of the fluorinated powder and of its inorganic filler Chinafill® 800.
Figure 8C:
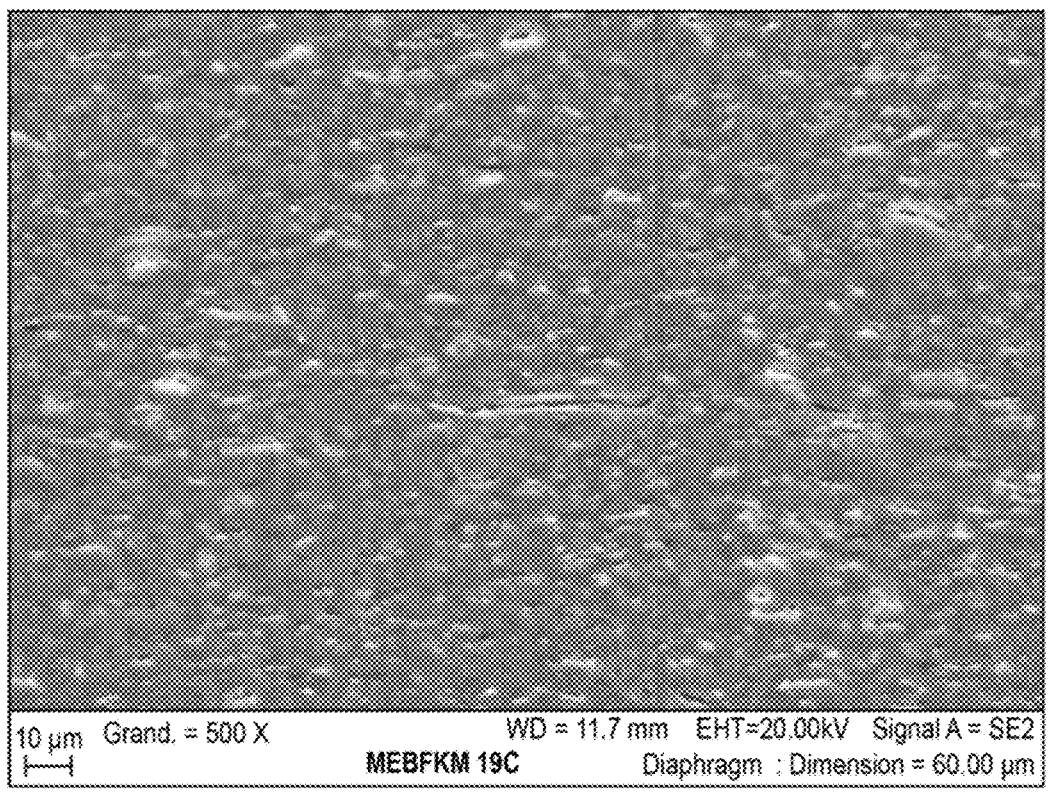
FIG. 8C is a SEM snapshot of the composition C according to the invention showing in particular the morphology of the dispersion of the fluorinated powder and of its inorganic filler Chinafill® 800.
Figure 8D:
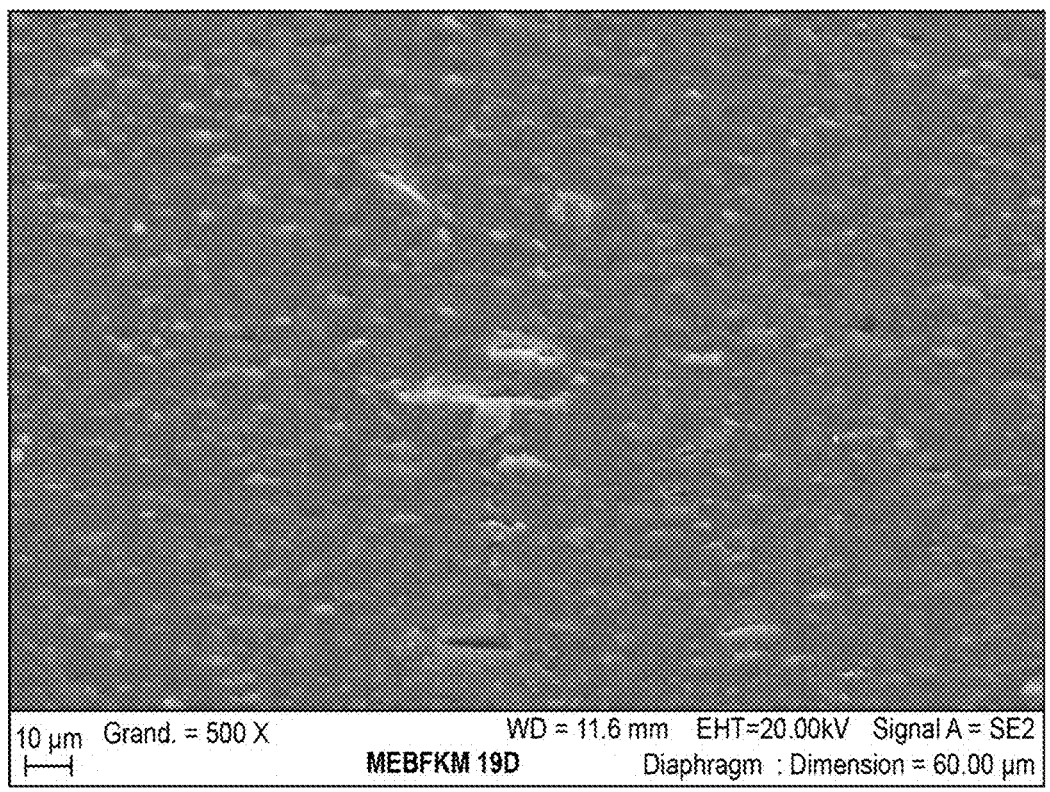
FIG. 8D is a SEM snapshot of the composition D according to the invention showing in particular the morphology of the dispersion of the fluorinated powder and of its inorganic filler Chinafill® 800.
Figure 8E:
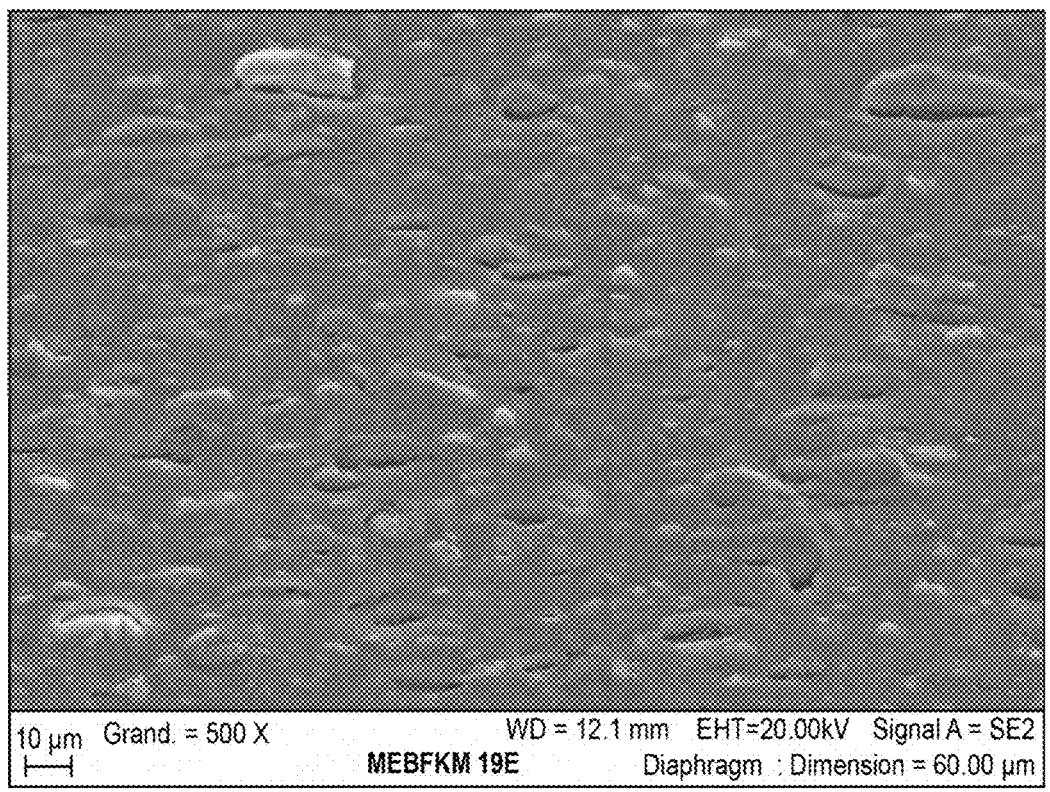
FIG. 8E is a SEM snapshot of the composition E according to the invention showing in particular the morphology of the dispersion of the fluorinated powder, of its inorganic filler Chinafill® 800 and of a graphite.
Figure 8F:
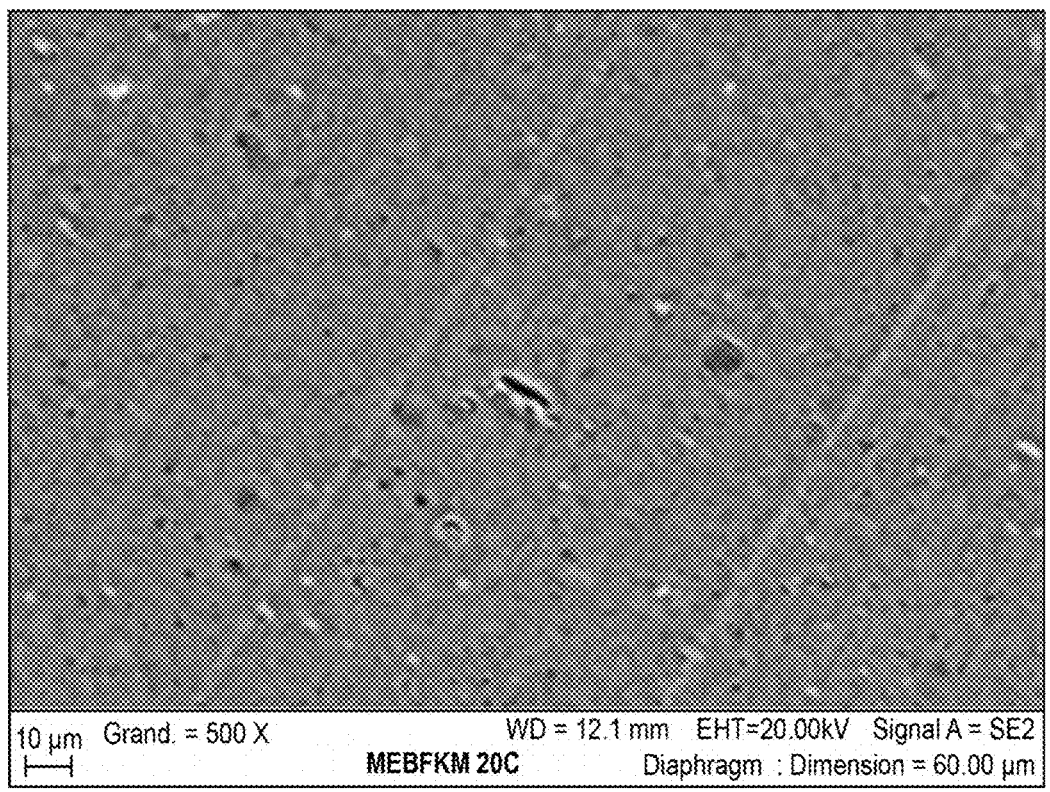
FIG. 8F is a SEM snapshot of the composition F that is not in accordance with the invention showing in particular the morphology of the dispersion of the fluorinated powder and of the carbon black that it contains.
Figure 8G:
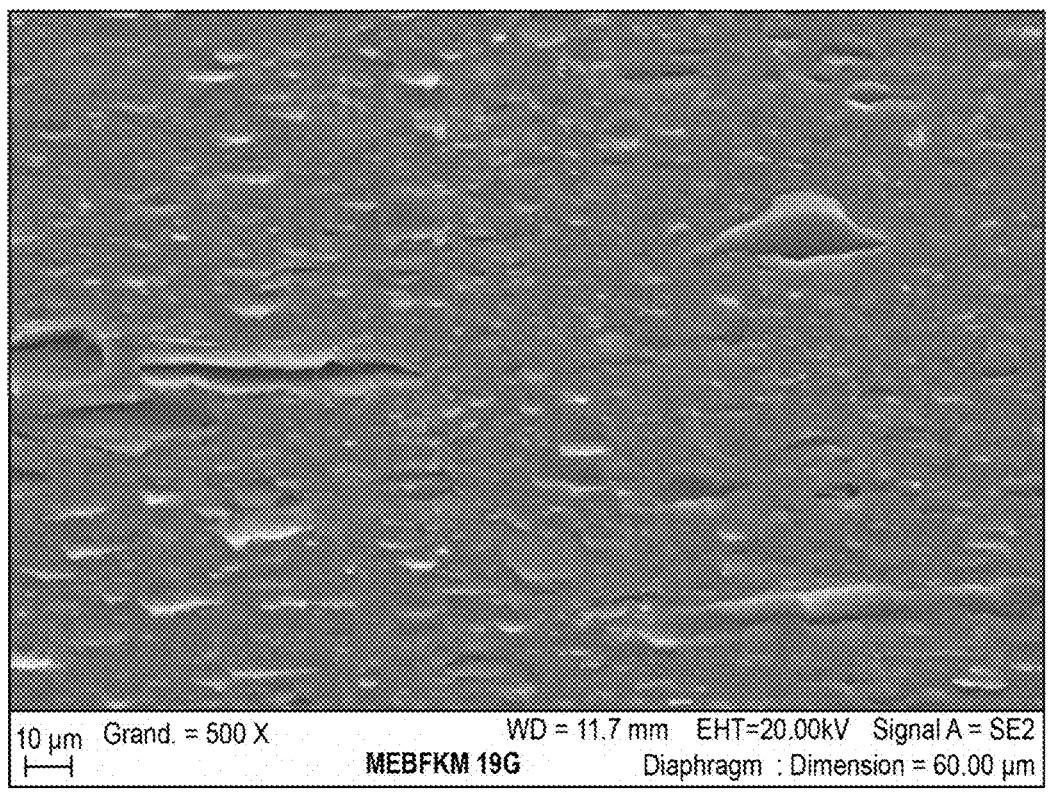
FIG. 8G is a SEM snapshot of the composition G according to the invention showing in particular the morphology of the dispersion of the fluorinated powder, of its inorganic filler Chinafill® 800 and of a graphite.
Figure 8H:
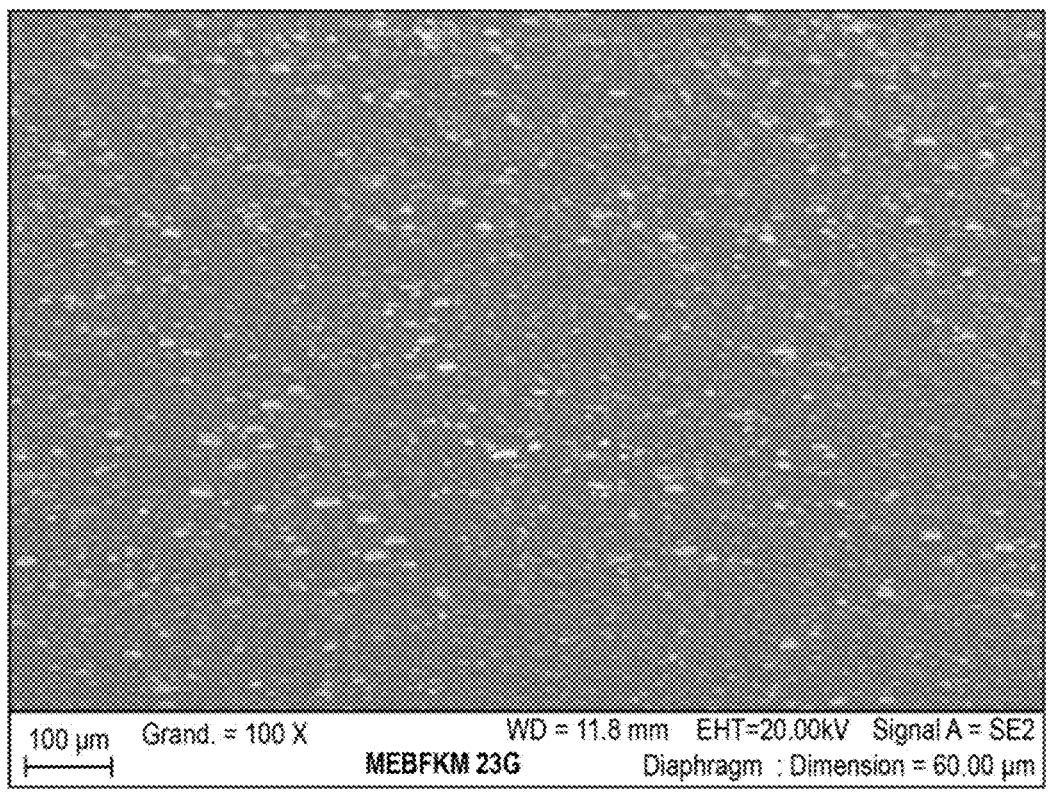
FIG. 8H is a SEM snapshot of the control composition H showing in particular the morphology of the dispersion of its fluorinated powder and of the carbon black.
Figure 8I:
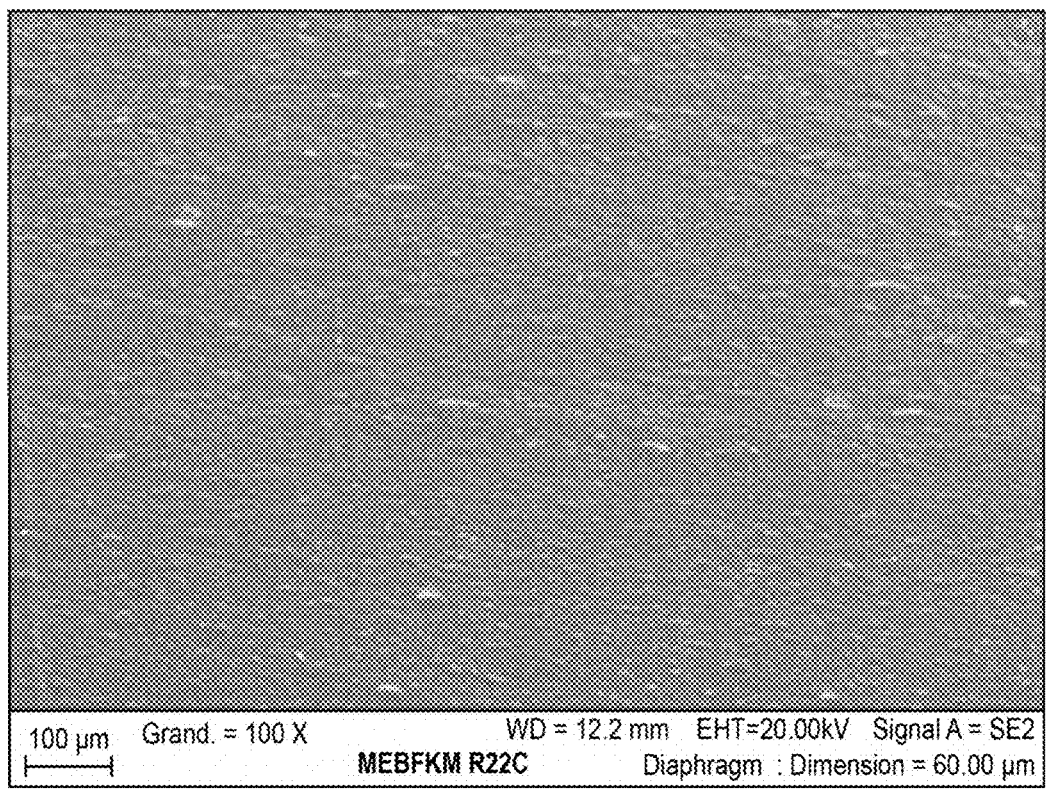
FIG. 8I is a SEM snapshot of the composition I according to the invention showing in particular the morphology of the dispersion of its fluorinated powder and of its inorganic filler Barrisurf® HX.
Figure 8J:
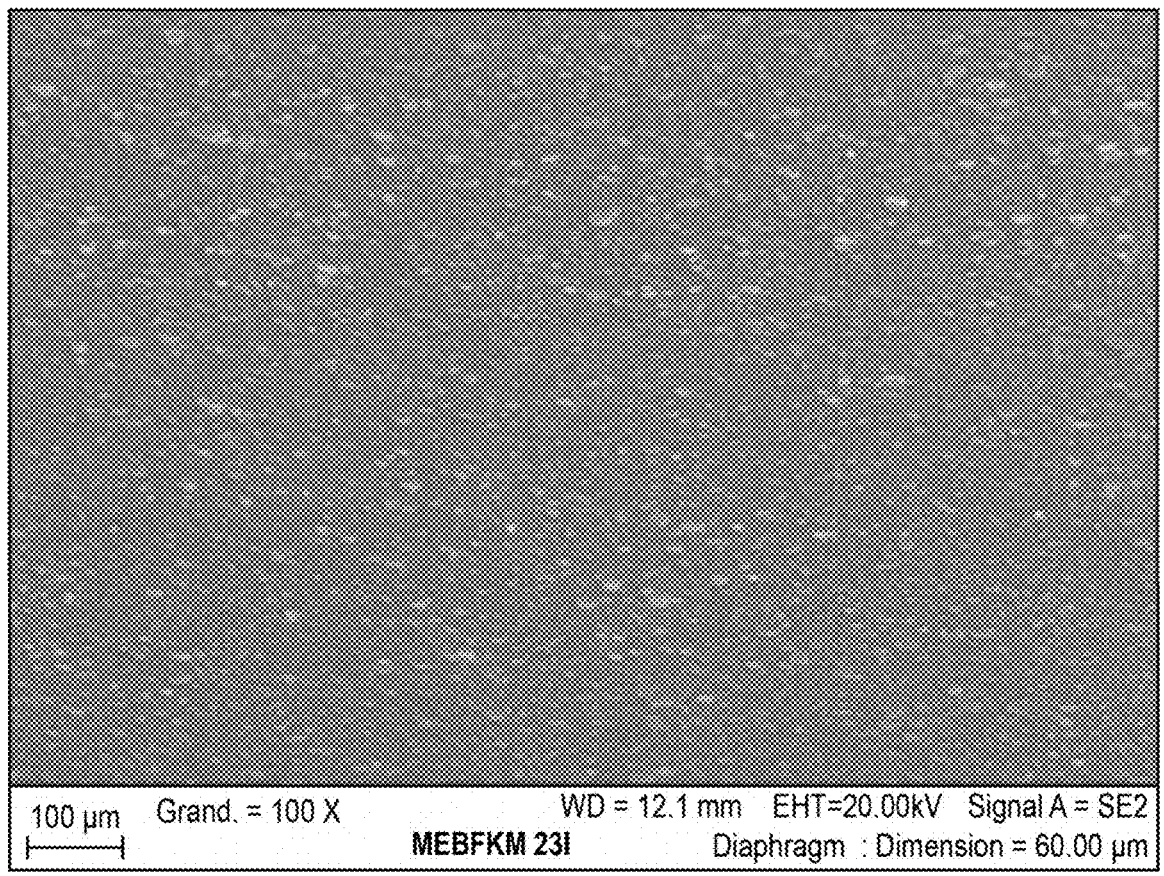
FIG. 8J is a SEM snapshot of the control composition J showing in particular the morphology of the dispersion of its fluorinated powder and of the carbon black.

FIGS. 8H to 8J show the morphologies respectively obtained for the crosslinked compositions H, I, J, following the crosslinking thereof with peroxide (at t95 at 180° C., without post-curing), with the homogeneous dispersion of the fluorinated powder of PTFE and, for the composition I of the invention, of the filler Barrisurf® HX.

Table 8 hereinafter shows the properties measured as hereinabove for these compositions H to L, in the non-crosslinked as well as crosslinked state.

TABLE 8

| | unit | H | I | J | K | L |
|---|---|---|---|---|---|---|
| Non-crosslinked composition | | | | | | |
| ML (1 + 4) 100° C. | MU | 56 | 63 | 67 | 62 | 72 |
| Crosslinked composition Initial state traction | | | | | | |
| Resistance to break. | MPa | 9.1 | 10.7 | 9.7 | 9.8 | 10.1 |
| Elongation at break. | % | 337 | 298 | 282 | 270 | 215 |
| Modulus 50% | MPa | 2.3 | 5.0 | 3.8 | 3.9 | 5.9 |
| Modulus 100% | MPa | 2.7 | 6.2 | 4.8 | 4.7 | 7.3 |
| Modulus 200% | MPa | 3.9 | 8.1 | 7.4 | 6.8 | 9.8 |
| Delft tearing | | | | | | |
| Resistance | N/mm | 15.7 | 19.3 | 15.3 | 13.3 | 15.6 |
| Shore A hardness at 3 s | | | | | | |
| Initial state | Sh A | 72 | 81 | 80 | 76 | 74 |
| CSR type B after 22 h at 135° C. and 25% compression | | | | | | |
| CSR | % | 22 | 24 | 24 | 24 | 25 |
| Permeability - FAM B, at 40° C. (average permeation rate over 18 days) | | | | | | |
| Average Q | g·h⁻¹·m⁻² | 0.44 | 0.24 | 0.48 | 0.35 | 0.18 |

Table 8 shows that the modification according to the invention of the formula FKM-PTFE by adding the filler with a high aspect ratio Barrisurf® HX does not penalise the mechanical properties of the compositions I and L according to the invention in the crosslinked state in relation to the control compositions H, J, K devoid of this filler, even by improving some of them (see in particular the resistance to breaking, the increased moduli and Shore hardness), and that this adding of the filler with a high aspect ratio even makes it possible to reduce the permeability to the fuel of the compositions I, L, in relation to these control compositions H, J, K.

Sliding measurements were taken on extrusion die walls that were respectively smooth and rough, concerning the control composition H and the composition of the invention I, by means of a capillary rheometer in order to reveal the difference in behaviour between these two compositions H and I (respectively without and with the clear filler Barrisurf® HX), via comparative measurements on a smooth die wall and on a rough die wall. The protocol hereinafter was followed for these capillary rheometer tests.

The compositions H and I were characterised using the capillary rheometer Göttfert 6000 in order to observe the sliding at the wall. Capillary extrusions at 70° C. were carried out through the following dies with a diameter equal to 1 mm:
- rough die with a length of 5 mm in order to evaluate the sliding at the wall,
- smooth die with a length of 5 mm in order to evaluate the sliding at the wall,
- dies with a quasi-zero length in order to perform the Bagley correction of the inlet pressure.

A $10^8$ Pa sensor was used to measure the pressures at the different programmed extrusion speeds, for shear rates ranging from 0.3 s⁻¹ to 30,000 s⁻¹. The selected die and the selected pressure sensor were installed, then a waiting time of about one half hour was respected in order for the test temperature to stabilise. The sheath was filled with the material to be tested (in the form of granules) and this was packed using a brass pestle. The piston was lowered until engaging in the sheath and observing the presence of an extrudate. The extrusion started after the programmed pre-heating to condition the material. The programmed speeds followed each other automatically. The test was stopped when the piston was fully descended, or when the pressure exceeded that of the sensor.

Figure 9:
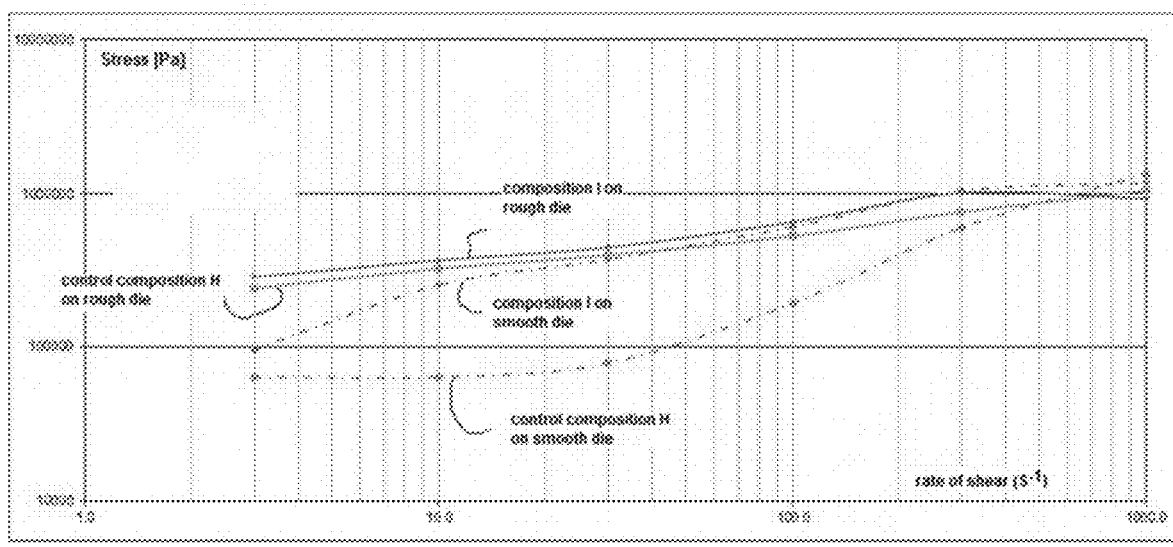
FIG. 9 is a graph showing the change in the stress (Pa) according to the shear rate ($s^{-1}$), measured by capillary rheometry for the control crosslinkable composition H and for the crosslinkable composition I according to the invention, at each time on a smooth wall of the extrusion die and on a rough wall of the extrusion die.

The results obtained can be seen in the graph of FIG. 9. For the composition H, it can be seen that the stress levels according to the shear rate are very different between the smooth die and the rough die, sign of a phenomenon of substantial sliding for this control composition H. On the contrary, for the composition I according to the invention, the smooth die/rough die curves are practically confounded starting at a shear rate of 10 s⁻¹, sign of low sliding at the wall.

Third Series of Tests:

This third series shows in particular the effect of the adding of the five aforementioned fillers with high aspect ratios in relation with FIGS. 1A to 5B in a control composition M without a filler with a high aspect ratio and of compositions according to the invention N, O, P, Q, R, which are all based on a blend of the two DAIEL G-902 (DAIKIN: 75 phr) and Tecnoflon P-459 (Solvay: 25 phr) FKMs and which all include 50 phr of powder of PTFE of denomination Algoflon® L203.

Each filler with a high aspect ratio was added according to 20 phr. The crosslinking system and the implementation assistance agent VPA 2 were the same as hereinabove.

Table 9 hereinafter provides details on the formulations of the compositions M to R (quantities in phr), and table 10 hereinafter the results obtained during extrusion tests in the same Garvey die as hereinabove (screw heated to 85° C., die at 95° C., speed of the screw of 8 rpm.).

TABLE 9

| | M | N | O | P | Q | R |
|---|---|---|---|---|---|---|
| DAIEL G-902 | 75 | 75 | 75 | 75 | 75 | 75 |
| Tecnoflon P-459 | 25 | 25 | 25 | 25 | 25 | 25 |
| Noir MT N 991 | 2 | 2 | 2 | 2 | 2 | 2 |
| VPA 2 | 1 | 1 | 1 | 1 | 1 | 1 |

TABLE 9-continued

|  | M | N | O | P | Q | R |
|---|---|---|---|---|---|---|
| TAIC liq | 2.1 | 2.1 | 2.1 | 2.1 | 2.1 | 2.1 |
| Algoflon L203 | 50 | 50 | 50 | 50 | 50 | 50 |
| Barrisurf HX |  | 20 |  |  |  |  |
| Chinafill 800 |  |  | 20 |  |  |  |
| Mistron HAR |  |  |  | 20 |  |  |
| Suzorite 325 HK |  |  |  |  | 20 |  |
| Mica F |  |  |  |  |  | 20 |
| DHBP 45 | 2 | 2 | 2 | 2 | 2 | 2 |

TABLE 10

|  | M | N | O | P | Q | R |
|---|---|---|---|---|---|---|
| Initiation of the feed | Jamming | Good | Good | Good | Good | Good |
| Pressure at die outlet (in $10^5$ Pa) | 50 | 55 | 50 | 65 | 45 | 40 |
| Aspect (classification system A) | 4.4.4.4 | 4.4.4.4 | 4.4.4.4 | 4.4.3, 5.4 | 4.4.4.4 | 4.4.3.4 |

FIGS. 11A to 11G show the aspect of the surfaces and of the end profiles respectively obtained for these compositions M to R, following these Garvey extrusion tests.

The control composition M is therefore not correctly extrudable, see the priming of the feed. On the contrary, the compositions N to R that incorporate 20 phr of fillers with corresponding high aspect ratios show a clear improvement in the extrusion conditions with a resolution of the material sliding problems at the feed and a stabilisation in the extrusion pressure, without degrading the Garvey score on the extrudates obtained.

Table 11 hereinafter shows the properties measured as hereinabove for these compositions M to R, in the non-crosslinked as well as crosslinked state.

TABLE 11

|  | unit | M | N | O | P | Q | R |
|---|---|---|---|---|---|---|---|
| Non-crosslinked composition | | | | | | | |
| ML (1 + 4) 100° C. | MU | 54 | 56 | 56 | 61 | 57 | 54 |
| Crosslinked composition Initial state traction | | | | | | | |
| Resistance to break. | MPa | 10.5 | 9.6 | 8.7 | 9.7 | 9.3 | 9.4 |
| Elongation at break. | % | 393 | 274 | 262 | 304 | 295 | 319 |
| Modulus 50% | MPa | 1.8 | 4.5 | 4.0 | 4.3 | 4.2 | 3.7 |
| Modulus 100% | MPa | 2.4 | 6.0 | 5.4 | 5.5 | 5.4 | 4.8 |
| Modulus 200% | MPa | 3.5 | 8.1 | 7.5 | 7.2 | 7.2 | 6.6 |
| Delft tearing | | | | | | | |
| Resistance | N/mm | 10.8 | 19.6 | 12.6 | 19.4 | 12.6 | 19.4 |
| Shore A hardness at 3 s | | | | | | | |
| Initial state | Sh A | 69 | 81 | 80 | 81 | 80 | 79 |
| CSR type B after 22 h at 135° C. and 25% compression | | | | | | | |
| CSR | % | 17 | 19 | 21 | 21 | 17 | 16 |
| Permeability - FAM B, at 40° C. (average permeation rate over 18 days) | | | | | | | |
| Average Q | $g \cdot h^{-1} \cdot m^{-2}$ | 0.35 | 0.18 | 0.17 | 0.21 | 0.23 | 0.23 |

Table 11 shows that the modification according to the invention of the formula FKM-PTFE by the adding of each filler with a high aspect ratio tested does not penalise the mechanical properties of the compositions N to R according to the invention in the crosslinked state in relation to the control composition M devoid of this filler, even by improving some of them (see in particular the resistance to breaking, the increased moduli and Shore hardness), and that this adding of each filler with a high aspect ratio even makes it possible to reduce the permeability to the fuel of the compositions N to R in relation to this control composition M.

Figure 12:
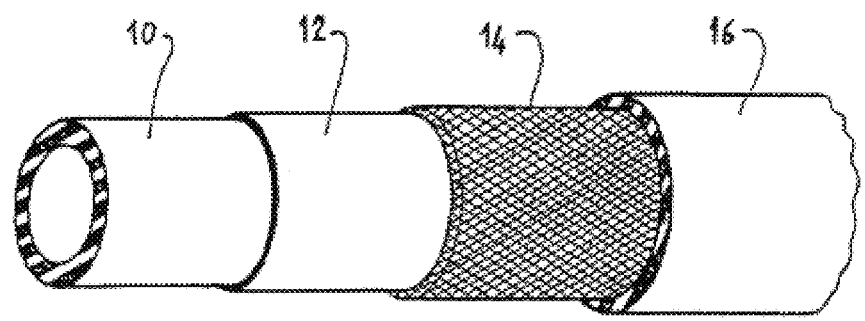
FIG. 12 is a partial view in perspective with partial pull-outs of a fuel hose according to an embodiment of the invention, of which the inner layer is formed from a crosslinked composition according to the invention.

FIG. 12 shows an example of a structure that can be used for a fuel hose according to the invention, comprising a radially internal layer 10 (or sheath) formed from a rubber composition according to the invention, an intermediate layer of rubber 12 for example based on an epichlorhydrin rubber (ECO), a textile reinforcement, 14 and a radially external layer 16 for example also based on an ECO, although other structures and rubber compositions can be used for the layers other than the sheath.

The invention claimed is:

1. A crosslinkable rubber composition, the crosslinkable rubber composition being based on at least one fluoroelastomer (FKM) and comprising a filler and a micronised powder of at least one fluorinated thermoplastic polymer which are dispersed in said at least one fluoroelastomer,
   wherein the crosslinkable rubber composition comprises said micronised powder according to a quantity greater than 40 phr (phr: parts by weight per 100 parts of parts of elastomer(s)),
   wherein the filler comprises at least one inorganic filler having lamellas which has an aspect ratio greater than 30 and which is based on a phyllosilicate chosen from kaolinite and micas, or is based on a talc, said aspect ratio being defined as being the ratio of an average largest dimension over an average smallest dimension of the lamellas, said ratio being measured by a scanning electron microscopy technique,
   wherein the crosslinkable rubber composition is able to form an extruded inner layer of a fuel hose for a motor vehicle,
   wherein said at least one fluoroelastomer is an FKM chosen from terpolymers of vinylidene fluoride (VDF)-hexafluoropropylene (HFP)-tetrafluoroethylene (TFE) with a fluorine mass rate greater than or equal to 70%, and
   wherein the crosslinkable rubber composition comprises at least two of said fluoroelastomers (FKM), comprising a first FKM and a second FKM with respective Mooney viscosities ML(1+10) at 121° C., measured according to the standard ASTM D 1646, comprised between 17 and 21 and between 22 and 26.

2. The crosslinkable rubber composition according to claim 1, in which said at least one inorganic filler has an average transversal smaller dimension which defines an average thickness of lamellas comprised between 100 nm and 500 nm and an average larger dimension which defines an average width of lamellas comprised between 1 µm and 50 µm.

3. The crosslinkable rubber composition according to claim 1, in which said micronised powder is based on at least one polytetrafluoroethylene (PTFE) modified or not in terms of said at least one fluorinated thermoplastic polymer, and has an average particle diameter D50 measured according to the standard ASTM D 4464 which is comprised between 2 µm and 20 µm.

4. The crosslinkable rubber composition according to claim 3, in which the average particle diameter D50 measured according to the standard ASTM D 4464 is comprised between 5 μm and 15 μm.

5. The crosslinkable rubber composition according to claim 1, in which the filler comprises said at least one inorganic filler according to a mass fraction of at least 40%.

6. The crosslinkable rubber composition according to claim 5, in which the filler comprises said at least one inorganic filler according to a mass fraction greater than 50%.

7. The crosslinkable rubber composition according to claim 1, in which the crosslinkable rubber composition comprises said micronised powder according to a quantity comprised between 45 and 65 phr and said at least one inorganic filler according to a quantity comprised between 5 and 25 phr.

8. The crosslinkable rubber composition according to claim 7, in which the filler further comprises flail carbon black and/or graphite.

9. The crosslinkable rubber composition according to claim 8, in which the filler comprises less than 5 phr of carbon black and less than 10 phr of graphite.

10. The crosslinkable rubber composition according to claim 1, in which the crosslinkable rubber composition comprises a crosslinking system comprising a peroxide or a bisphenol.

11. The crosslinkable rubber composition according to claim 10, in which the crosslinkable rubber composition comprises the crosslinking system according to a quantity comprised between 2 and 6 phr.

12. The crosslinkable rubber composition according to claim 1, in which the crosslinkable rubber composition has, after passing through an extrusion die, a pressure applied to the crosslinkable rubber composition measured at an outlet of the die that is continuously comprised between $25 \cdot 10^5$ Pa and $70 \cdot 10^5$ Pa, with the die having the following characteristics:
- a conveying screw of diameter D equal to 25 mm and of length equal to 12D,
- a feed belt 2 to 3 cm wide,
- a feed roller cooled with a water circulation system,
- a screw body heated to 85° C. by a regulator by means of water,
- the die being heated to 95° C. or 110° C. by a heating ring,
- said pressure applied to the crosslinkable rubber composition at the outlet of the die being measured by a sensor at a head of the screw,
- a speed of the screw varying between 4 and 20 rpm regulated according to an aspect of the extruded crosslinkable rubber composition at the outlet of the die, and
- a conveyor belt on which the crosslinkable rubber composition is disposed for the driving thereof.

13. The crosslinkable rubber composition according to claim 1, in which the crosslinkable rubber composition has a Mooney viscosity ML(1+4) at 100° C. measured according to the standard ASTM D 1646 comprised between 50 and 75.

14. The crosslinkable rubber composition according to claim 13, in which the first FKM is present in the crosslinkable rubber composition according to a quantity of at least 50 phr, and the second FKM is present in the crosslinkable rubber composition according to a quantity of at most 50 phr.

15. The crosslinkable rubber composition according to claim 1, in which said at least one inorganic filler is based on said phyllosilicate, of which the aspect ratio is at least 35.

16. The crosslinkable rubber composition according to claim 15, in which the aspect ratio of said phyllosilicate is at least 80.

17. The crosslinkable rubber composition according to claim 16, in which said at least one inorganic filler comprises kaolinite, being based on a kaolin.

18. The crosslinkable rubber composition according to claim 17, in which an average transversal smaller dimension of said kaolin defines an average thickness of lamellas comprised between 120 nm and 280 nm and an average larger dimension of said kaolin defines an average width of lamellas comprised between 4 μm and 12 μm.

19. The crosslinkable rubber composition according to claim 15, in which said at least one inorganic filler is based on a mica of the muscovite or phlogopite type.

20. The crosslinkable rubber composition according to claim 19, in which the aspect ratio of said mica is at least 120.

21. The crosslinkable rubber composition according to claim 19, in which an average transversal smaller dimension of said mica defines an average thickness of lamellas comprised between 110 nm and 470 nm and an average larger dimension of said mica defines an average width of lamellas comprised between 113 μm and 40 μm.

22. The crosslinkable rubber composition according to claim 1, in which said at least one inorganic filler is based on a talc of which the aspect ratio is at least 35.

23. The crosslinkable rubber composition according to claim 22, in which an average transversal smaller dimension of said talc defines an average thickness of lamellas comprised between 120 nm and 180 nm and an average larger dimension of said talc defines an average width of lamellas comprised between 4 μm and 8 μm.

24. A crosslinked rubber composition able to form an extruded inner layer of a fuel hose for a motor vehicle, wherein the crosslinked rubber composition is the product of a chemical crosslinking by a peroxide or a bisphenol of the crosslinkable rubber composition according to claim 1.

25. The crosslinked rubber composition according to claim 24, in which the crosslinked rubber composition has an average permeation flux Q with an alcohol essence of the FAM B type such as described in the standard DIN 51604, said permeation flux being measured through a plate formed from the crosslinked rubber composition over 18 days at 40° C. according to the standard D 451652 of PSA of June 2010, which is less than 0.30 $g \cdot h^{-1} \cdot m^{-2}$.

26. The crosslinked rubber composition according to claim 25, in which the crosslinked rubber composition satisfies at least one of the conditions (i) to (iii) hereinafter:
(i) at least one of the following secant moduli M50, M 100 and M200 respectively at 50% 100% and 200% deformation, measured in uni-axial tensile force according to the standard ASTM D 412:
M50 greater than 3 MPa,
M100 greater than 4 MPa,
M200 greater than 6 MPa;
(ii) a resistance to breaking R/r, measured in uni-axial tensile force according to the standard ASTM D 412, greater than 8 MPa; and
(iii) a Shore A hardness measured after 3 seconds according to the standard ASTM D2240 which is greater than 70.

27. A method for preparing a crosslinkable rubber composition according to claim 1, wherein the method comprises the following steps:
a) thermomechanical mixing of said at least one fluoroelastomer (FKM), of said filler and of said micronised powder of at least one fluorinated thermoplastic polymer and of other ingredients of the crosslinkable rubber composition with the exception of a crosslinking system, the mixing being implemented at a falling temperature between 90 and 100° C. with a peak temperature between 105 and 115° C.;

b) mechanical mixing of the mixture obtained in step a) on cylinders with the adding of the crosslinking system comprising a peroxide or a bisphenol, for the obtaining of the crosslinkable rubber composition.

28. A tubular extrudate, wherein the tubular extrudate is formed from a crosslinkable composition, the crosslinkable composition being based on at least one fluoroelastomer (FKM) and comprising a filler and a micronised powder of at least one fluorinated thermoplastic polymer which are dispersed in said at least one fluoroelastomer, wherein the crosslinkable composition comprises said micronised powder according to a quantity greater than 40 phr (phr: parts by weight per 100 parts of elastomer(s)), wherein the filler comprises at least one inorganic filler having lamellas which has an aspect ratio greater than 30 and which is based on a phyllosilicate chosen from kaolinite and micas, or is based on a talc, said aspect ratio being defined as being the ratio of an average largest dimension over an average smallest dimension of the lamellas, said ratio being measured by a scanning electron microscopy technique, wherein the tubular extrudate is able to form after crosslinking an inner layer of a fuel hose for a motor vehicle, wherein said at least one fluoroelastomer is an FKM chosen from terpolymers of vinylidene fluoride (VDF)-hexafluoropropylene (HFP)-tetrafluoroethylene (TFE) with a fluorine mass rate greater than or equal to 70%, and wherein the crosslinkable composition comprises at least two of said fluoroelastomers (FKM), comprising a first FKM and a second FKM with respective Mooney viscosities ML(1+10) at 121° C., measured according to the standard ASTM D 1646, comprised between 17 and 21 and between 22 and 26.

29. A fuel hose for a motor vehicle with a combustion or hybrid engine, including a radially internal layer and at least one radially external layer, wherein the radially internal layer is formed from a crosslinked rubber composition which is the product of a chemical crosslinking by a peroxide or a bisphenol of a crosslinkable rubber composition, with the fuel hose further including, between the radially internal and external layers, at least one radially intermediate layer and a textile reinforcement, wherein the crosslinkable rubber composition is based on at least one fluoroelastomer (FKM) chosen from terpolymers of vinylidene fluoride (VDF)-hexafluoropropylene (HFP)-tetrafluoroethylene (TFE) with a fluorine mass rate greater than or equal to 70%, and comprises a filler and a micronised powder of at least one fluorinated thermoplastic polymer which are dispersed in said at least one fluoroelastomer, wherein the crosslinkable rubber composition comprises said micronised powder according to a quantity greater than 40 phr (phr: parts by weight per 100 parts of parts of elastomer(s)), wherein the filler comprises at least one inorganic filler having lamellas which has an aspect ratio greater than 30 and which is based on a phyllosilicate chosen from kaolinite and micas, or is based on a talc, said aspect ratio being defined as being the ratio of an average largest dimension over an average smallest dimension of the lamellas, said ratio being measured by a scanning electron microscopy technique, and wherein the crosslinkable rubber composition comprises at least two of said fluoroelastomers (FKM), comprising a first FKM and a second FKM with respective Mooney viscosities ML(1+10) at 121° C., measured according to the standard ASTM D 1646, comprised between 17 and 21 and between 22 and 26.

30. A fuel feed circuit of a motor vehicle with a combustion or hybrid engine comprising lines between a fuel tank and a fuel injection rail, wherein at least one of the lines comprises a fuel hose according to claim 29.

* * * * *

UNITED STATES PATENT AND TRADEMARK OFFICE
CERTIFICATE OF CORRECTION

PATENT NO. : 11,932,755 B2
APPLICATION NO. : 16/838317
DATED : March 19, 2024
INVENTOR(S) : Laborbe et al.

Page 1 of 1

It is certified that error appears in the above-identified patent and that said Letters Patent is hereby corrected as shown below:

In the Claims

Column 19,
Line 19, "comprises flail carbon" should read --comprises carbon--.

Column 20,
Line 5, "claim 16" should read --claim 15--;
Line 48, "claim 25" should read --claim 24--.

Signed and Sealed this
Twenty-second Day of October, 2024

Katherine Kelly Vidal
*Director of the United States Patent and Trademark Office*